US010589273B2

(12) United States Patent
Eckhardt et al.

(10) Patent No.: US 10,589,273 B2
(45) Date of Patent: Mar. 17, 2020

(54) CATIONIC POLYMERS AND METHOD OF SURFACE APPLICATION

(71) Applicant: Illumina, Inc., San Diego, CA (US)

(72) Inventors: Allen E Eckhardt, San Diego, CA (US); Rigo Pantoja, San Diego, CA (US); Sean M Ramirez, San Diego, CA (US); Petr Capek, San Diego, CA (US); Edwin Li, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 149 days.

(21) Appl. No.: 15/572,128

(22) PCT Filed: May 4, 2016

(86) PCT No.: PCT/US2016/030742

§ 371 (c)(1),
(2) Date: Nov. 6, 2017

(87) PCT Pub. No.: WO2016/182814

PCT Pub. Date: Nov. 17, 2016

(65) Prior Publication Data

US 2019/0151850 A1 May 23, 2019

Related U.S. Application Data

(60) Provisional application No. 62/159,004, filed on May 8, 2015, provisional application No. 62/308,644, filed on Mar. 15, 2016.

(51) Int. Cl.

| | |
|---|---|
| ***B32B 9/04*** | (2006.01) |
| ***B01L 3/00*** | (2006.01) |
| *B32B 27/00* | (2006.01) |

(52) U.S. Cl.

CPC ... *B01L 3/502784* (2013.01); *B01L 3/502707* (2013.01); *B01L 2200/0673* (2013.01);

(Continued)

(58) Field of Classification Search

CPC ............ C12Q 1/6848; C12Q 2565/629; B01L 2400/0427; B01L 2400/043; B01L 2200/0668; B01L 2200/10; B01L 2300/0681; B01L 2300/0816; B01L 2300/0887; B01L 2300/089; B01L 2300/12; B01L 2300/16; B01L 2300/161;

(Continued)

(56) References Cited

U.S. PATENT DOCUMENTS

| | | | |
|---|---|---|---|
| 2006/0164490 A1 | 7/2006 | Kim et al. | |
| 2010/0221713 A1 | 9/2010 | Pollack | |

(Continued)

OTHER PUBLICATIONS

Bischoff, L., Authorized Officer, European Patent Office, International Search Report, International Application No. PCT/US2016/030742, dated Nov. 28, 2016, 8 pages.

*Primary Examiner* — Jennifer Wecker
(74) *Attorney, Agent, or Firm* — Illumina, Inc.

(57) ABSTRACT

Embodiments of present application are directed to microfluidic devices and particularly digital micro-plastic fluidic devices that are specifically designed to prevent sample contamination during sample processing, methods of manufacturing the same, and methods to improve sample analysis process by preventing sample contamination.

19 Claims, 13 Drawing Sheets

(52) U.S. Cl.
CPC . *B01L 2200/141* (2013.01); *B01L 2300/0645* (2013.01); *B01L 2300/0816* (2013.01); *B01L 2300/0887* (2013.01); *B01L 2300/16* (2013.01); *B01L 2300/161* (2013.01); *B01L 2300/163* (2013.01); *B01L 2400/0427* (2013.01)

(58) Field of Classification Search
CPC ............. B01L 2300/165; B01L 3/0268; B01L 3/502707; B01L 3/502753; B01L 3/502761; B01L 3/502784; B01L 3/502792; B01L 7/52; B01L 7/525; B05B 5/087
See application file for complete search history.

(56) References Cited

U.S. PATENT DOCUMENTS

| | | | | |
|---|---|---|---|---|
| 2012/0044299 | A1* | 2/2012 | Winger | B41J 2/1606 347/54 |
| 2013/0333762 | A1* | 12/2013 | Winger | G05D 7/0629 137/1 |

* cited by examiner

CATIONIC POLYMERS AND METHOD OF SURFACE APPLICATION

INCORPORATION BY REFERENCE TO ANY PRIORITY APPLICATIONS

The present application is a 35 U.S.C. § 371 National Stage application of International Patent Application No. PCT/US2016/030742, filed on May 4, 2016, which further claims the benefit of priority to U.S. Provisional Application Nos. 62/159,004, filed May 8, 2015 and 62/308,644, filed Mar. 15, 2016, each of which is hereby incorporated by reference in its entirety.

FIELD

In general, the present application is in the field of microfluidic devices and particularly digital microfluidic devices, including methods of manufacturing and methods to improve sample analysis by preventing sample contamination.

BACKGROUND

Microfluidic devices are miniature fluidic devices dealing with small fluidic volumes, usually in the sub-milliliter range. Microfluidic devices typically have micromechanical structures (microchannels, microtracks, micropaths, microvalves and others) and employ various fluid-moving mechanisms, such as mechanical parts (e.g., micropumps) hydropneumatic devices/methods and electrically-based effects (electrophoretic, dielectrophoretic, electro-osmotic, electrowetting, opto-electrowetting, and variations of these effects as well as other effects).

For biomedical applications, some microfluidic devices are designed to conduct sample processing, including concentration, filtration, washing, dispensing, mixing, transport, sample splitting, sample lysing and other sample handling functions.

Exemplary microfluidic devices of the present application include digital fluidic cartridges comprising a top plate, usually made of plastic, which is coated with a conductive coating layer, two hydrophobic layers with tracks or paths of electrode in between, a dielectric coating and a printed circuit board (PCB) bottom. The space between the two hydrophobic layers can be filled with a filler fluid which is immiscible with the sample fluid. In some instances, the conductive coating layer comprises poly(3,4-ethylenedioxythiophene) (PEDOT). One or more ionenes are often added to the conductive coating layer to increase the solubility of PEDOT for deposition. One example is polystyrene sulfonic acid (PSS) or polystyrene sulfonate.

SUMMARY

Some embodiments of the present application are directed to microfluidic devices comprising a surface of a microfluidic device; a conductive coating layer comprising one or more polymers; a passivation layer; one or more hydrophobic coating layers; and one or more microchannels, microtracks or micropaths; wherein the passivation layer is immediately adjacent to the conductive coating layer and in between the conductive coating layer and one hydrophobic coating layer; and wherein the passivation layer comprises a water-insoluble material to prevent the leaching of the conductive coating layer polymers into a sample fluid when said sample fluid passes through the microchannels, microtracks or micropaths during sample analysis. In some embodiments, the surface comprises or is a top plate.

Some embodiments of the present application are directed to a system comprising a microfluidic device described herein coupled to and controlled by a computer processor.

Some embodiments of the present application are directed to methods of manufacturing a microfluidic device to prevent sample contamination during sample analysis, comprising: providing microfluidic device components comprising a surface of a microfluidic device and a conductive coating layer comprising one or more polymers; forming a passivation layer immediately adjacent to the conductive coating layer, wherein the passivation layer comprises a water-insoluble material to prevent the leaching of the conductive coating layer polymers into a sample fluid. In some embodiments, the surface comprises or is a top plate.

Some embodiments of the present application are directed to methods of preventing sample contamination during sample analysis using a microfluidic device, comprising: mixing a cationic compound with a sample fluid; providing a microfluidic device comprising a surface of a microfluidic device, a conductive coating layer comprising one or more polymers, one or more hydrophobic coating layers, and one or more microchannels, microtracks or micropaths, wherein the microchannels, microtracks or micropaths contain or are immersed in a filler fluid that is immiscible with the sample fluid; passing the sample fluid through the microchannels, microtracks or micropaths such that the cationic polymer in the sample fluid forms a passivation layer immediately adjacent to the conductive coating layer; and wherein the passivation layer comprises a water-insoluble material to prevent the leaching of the conductive coating layer polymers into the sample fluid. In some embodiments, the surface comprises or is a top plate.

Some embodiments of the present application are directed to methods of reducing enzyme inhibition in a sample analysis using a microfluidic device comprising: providing a microfluidic device described herein, wherein said microfluidic device comprises a passivation layer; conducting sample analysis using a sample assay comprising one or more enzymes; wherein the enzyme inhibition is reduced relative to the use of a microfluidic device without a passivation layer.

DETAILED DESCRIPTION OF THE EMBODIMENTS

Figure 1:
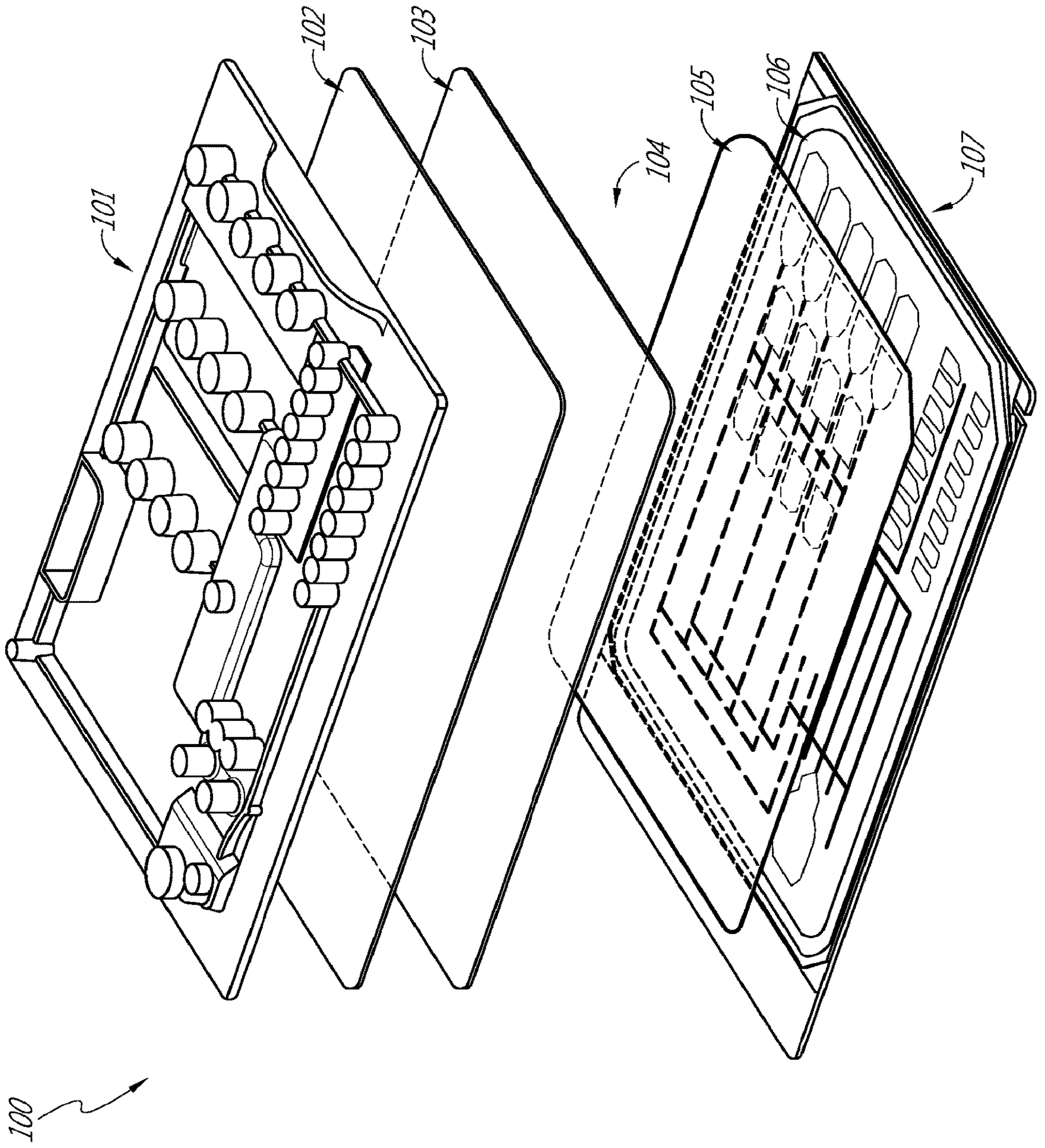
FIG. 1 is a graphic example of a digital microfluidic device cartridge with various components.

The present disclosure relates to microfluidic devices and particularly to digital microfluidic devices that are designed to prevent sample contamination during sample processing, methods of manufacturing the same, and methods to improve sample analysis process by preventing sample contamination. An embodiment of the microfluidic device cartridge of the present disclosure has a plastic top plate coated with a conductive coating layer of poly(3,4-ethylenedioxythiophene (PEDOT) and an anionic polymer polystyrene sulfonic acid (PSS) or polystyrene sulfonate. We have found that PSS can inhibit enzyme activity by leaching through the underlying hydrophobic coating of the device, and causing enzyme inhibition in the sample fluid. The PSS leaching could be detrimental to the biological sample analysis, for example, the downstream sequencing-by-synthesis process because it may inhibit the amplification or other enzymes in the samples. Embodiments of the invention therefore include a conductive coating layer that has been passivated with a cationic compound that can form a water-insoluble complex with the anionic polymer PSS at the interface between the conductive coating layer and the hydrophobic coating layer, thereby limiting the leaching of PSS into the sample fluid. In one embodiment, the cationic polymer is a fluorinated cationic polymer. In addition, the formation of the passivation layer also facilitates the adhesion of the hydrophobic coating layer (e.g., CYTOP) and has little or no effect on the conductance of the layers.

To prevent or eliminate leaching of anionic polymers such as PSS from the conductive coating layer, one option is to prepare a conductive coating layer that does not contain any cationic polymer. As described below, a conductive layer can be prepared by attaching an anchor molecule to the surface, extending the anchor and directly growing the conductive polymer on the surface through a polymerization reaction. This method is different from coating the surface with a mixture or copolymer of an anionic polymer (e.g. PSS) and a conductive polymer (e.g. PEDOT), and it eliminates any use of anionic polymers in forming the conductive coating layer. This type of conductive coating layer not only eliminates any leaching problem but also maintains a high conductivity suitable for use in a microfluidic device.

Some alternative embodiments relate to methods of making microfluidic devices that do not require the use of the anionic polymer PSS in the processing, but still allow a conductive coating layer such as poly(3,4-ethylenedioxythiophene (PEDOT) to be present in the device. For example, in one alternate embodiment, a conductive coating layer is formed on the microfluidic device through plasma etching or oxidative chemical vapor deposition. In one example, the microfluidic device can be made by treating a surface of the device to attach one or more first monomers on the surface. The method can then include forming a conductive coating layer by reacting the first monomer with one or more second monomers to form one or more conductive polymers on the surface. This will be explained more fully below.

Other alternative embodiments relate to microfluidic devices for sequencing a nucleic acid and having a conductive coating layer that consists essentially of one or more conductive polymers. Some embodiments relate to a microfluidic device for sequencing a nucleic acid that includes a surface and a conductive coating layer disposed adjacent to the surface. In this embodiment, the conductive coating layer may consist essentially of one or more conductive polymers, such as homopolymers or a hydrophobic coating layer disposed directly adjacent to the conductive coating layer. The device may also have a chamber adjacent to the hydrophobic coating layer, where the chamber includes a filler fluid that is immiscible with a sample fluid that contains the nucleic acid.

Some alternative embodiments relate to a method of sequencing a target nucleic acid using the microfluidic device described herein by injecting a sample fluid having the target nucleic acid into the microfluidic device and then sequencing the target nucleic acid.

The following detailed description is directed to certain specific embodiments of the present application. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment can be included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The section headings used herein are for organizational purposes only and are not to be construed as limiting the subject matter described.

Definitions

Unless defined otherwise, all technical and scientific terms used herein have the same meaning as is commonly understood by one of ordinary skill in the art. The use of the term "including" as well as other forms, such as "include", "includes," and "included," is not limiting. The use of the term "having" as well as other forms, such as "have", "has," and "had," is not limiting. As used in this specification, whether in a transitional phrase or in the body of the claim, the terms "comprise(s)" and "comprising" are to be interpreted as having an open-ended meaning. That is, the above terms are to be interpreted synonymously with the phrases "having at least" or "including at least." For example, when used in the context of a process, the term "comprising" means that the process includes at least the recited steps, but may include additional steps. When used in the context of a compound, composition, or device, the term "comprising" means that the compound, composition, or device includes at least the recited features or components, but may also include additional features or components.

As used herein, common abbreviations are defined as follows:

FP Fluorescence polarization
ITO Indium tin oxide
PCB Printed circuit board
PECVD Plasma-enhanced chemical vapor deposition
PCR Polymerase chain reaction
PDMS Polydimethylsiloxane
PEDOT Poly(3,4-ethylenedioxythiophene
PSS Polystyrene sulfonic acid
RhoB Rhodamine B
SBS Sequencing-by-synthesis
ssDNA Single stranded DNA As used herein, the term "CYTOP" refers to an amorphous fluoropolymer. It has the same chemical, thermal, electrical and surface properties as conventional fluoropolymers. In addition, it has high optical transparency and good solubility in specific fluorinated solvent due to amorphous morphology. CYTOP is a trademark registered in Japan.

Microfluidic Cartridges

Some embodiments of the present application are directed to microfluidic devices having a surface of a microfluidic device; a conductive coating layer with one or more polymers; a passivation layer; one or more hydrophobic coating layers; and one or more microchannels, microtracks or micropaths; wherein the passivation layer is immediately adjacent to the conductive coating layer and in between the conductive coating layer and one hydrophobic coating layer; and wherein the passivation layer comprises a water-insoluble material to prevent the leaching of the conductive coating layer polymers into a sample fluid when said sample fluid passes through the microchannels during sample analysis.

In some embodiments, the surface is part of a substrate. In some embodiments, the substrate makes up a top plate of the microfluidic device. In some embodiments, the surface is part of a top plate, such as a top plate of digital microfluidic cartridge. In some other embodiments, the surface could also be any surface in an electrowetting device, or other microfluidic device, such as the surface of a channel. For example, the surface could be part of a microfluidic sensor structure, such as an impedance sensor.

In some embodiments, the sample fluid is an aqueous-based sample fluid. In some other embodiments, the sample fluid is a mixture of water and one or more organic solvents such as alcoholic solvents. In some other embodiments, the sample fluid contains only one or more organic solvents.

In some embodiments, the microfluidic device comprises a chamber having a filler fluid that is immiscible with the sample fluid. In some embodiments, the microfluidic devices are filled with a filler fluid that is immiscible with the sample fluid. In some such embodiments, the filler fluid comprises fluorinated hydrocarbons.

In some embodiments, the microfluidic device is a digital microfluidic device that employs mechanisms selected from electrowetting, opto-electrowetting, electrostatic, electrophoretic, dielectrophoretic, electro-osmotic, or combinations thereof. In one embodiment, the digital microfluidic device employs an electrowetting mechanism. In some such embodiments, the digital microfluidic device comprises microtracks or micropaths of electrodes.

In some embodiments, the conductive coating layer comprises one or more conductive inks or conductive polymers. In some such embodiment, the conductive coating layer is patterned. In some embodiments, the conductive coating layer is grounded or floated or serves as a receptor of electrons. In some further embodiments, the conductive coating layer forms electrodes. For example, it can be patterned to form electrowetting electrodes, or a ground on the top plate that reflects the pattern of electrowetting electrodes on the bottom substrate, or a ground on the bottom plate adjacent the electrowetting electrodes, or a series of sensors.

In some embodiments, the conductive coating layer comprises poly(3,4-ethylenedioxythiophene) (PEDOT). In some embodiments, the conductive coating layer comprises one or more ionene polymers. In some such embodiments, the conductive coating layer comprises polystyrene sulfonic acid or polystyrene sulfonate.

Cationic Compounds

In some embodiments, the passivation layer comprises a water-insoluble material. In some embodiments, the water-insoluble material of the passivation layer comprises a complex of a polymer of the conductive coating layer with a cationic compound.

The passivation layer can prevent leaching of the conductive coating layer polymers into the sample fluid. In some embodiments, the passivation layer prevents leaching of a hydrophilic polymer. In some embodiments, the passivation layer prevents leaching of polystyrene sulfonic acid or polystyrene sulfonate into the sample fluid. In some embodiments, the passivation layer is configured to work with a mechanism employed by the digital microfluidic device, such as an electrowetting mechanism. In some embodiments, the passivation layer does not interfere with the mechanism employed by the digital microfluidic device.

The passivation layer is sufficiently thick to prevent leaching of the conductive coating layer polymers. In some embodiments, the passivation layer has an average thickness in the range of about 0.01 nm to about 500 nm, about 0.05 nm to about 250 nm, about 0.05 nm to about 100 nm, about 0.05 nm to about 50 nm, about 0.05 nm to about 25 nm, about 0.1 nm to about 10 nm, about 0.1 nm to about 5 nm, about 0.1 nm to about 3.5 nm, about 0.1 nm to about 2.5 nm, about 0.2 nm to about 10 nm, about 0.2 nm to about 5 nm, about 0.2 nm to about 3.5 nm, about 0.2 nm to about 2.5 nm, about 0.5 nm to about 10 nm, about 0.5 nm to about 5 nm, about 0.5 nm to about 3.5 nm, about 0.5 nm to about 2.5 nm. In some embodiments, the passivation layer has an average thickness of about 0.01 nm, 0.025 nm, 0.05 nm, 0.1 nm, 0.15 nm, 0.2 nm, 0.25 nm, 0.3 nm, 0.5 nm, 0.75 nm, 1 nm, 1.5 nm, 2 nm, 3 nm, 5 nm, 7.5 nm, 10 nm, 15 nm, 20 nm, 25 nm, 30 nm, or 50 nm. The average thickness of the passivation layer can be measured by using AFM to measure the film thickness before and after deposing the passivation layer adjacent to the conductive coating layer.

The surface morphology of the passivation layer may be the same as or different from the morphology of the conductive coating layer. In some embodiments, the passivation layer has a rough surface. In some embodiments, the passivation layer has a smooth surface.

The passivation layer may include at least one layer of coating of a complex of the polymer of the conductive coating layer with a cationic compound. In some embodiments, the passivation layer comprises at least two layers of coating of a complex of the polymer of the conductive coating layer with a cationic compound. In some embodiments, the passivation layer comprises at least three, four, or five layers of coating of a complex of the polymer of the conductive coating layer with a cationic compound.

In some such embodiments, the cationic polymer is a fluorinated cationic polymer. In some further embodiments, the water-insoluble material of the passivation layer comprises the complex of polystyrene sulfonic acid or polystyrene sulfonate with a cationic compound.

In some embodiments, the cationic compound is water or aqueous soluble. In some such embodiments, the cationic compound is selected from cationic surfactants or cationic polymers, or combinations thereof.

Various cationic compounds can be used in the present application. When a cationic polymer is used, the cation can be present in either the polymer side chain or the polymer backbone. Non-limiting examples of such cationic polymer structure is shown below.

Cation present in side chain:

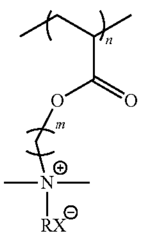

Cation present in backbone:

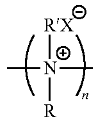

wherein R and R'═H, hydrocarbon chain, fluorinated hydrocarbon chain or other functionalities; X=counter anion.

In some embodiments, the cationic compound can be selected from ionene polymers or other polyquaterniums. In some such embodiments, the cationic compound can be selected from cationic polymers with a hydrophobic segment.

In some embodiments, the cationic polymer has a polyamide backbone. In some other embodiments, the cationic polymer preferably does not have ester groups in the backbone. This is because ester groups are more susceptible to degradation via hydrolysis. The hydrolysis may be particularly acute in the high pH environment encountered during SBS.

In some specific embodiments, the cationic compound is selected from Flexisperse™ HQ-30, Capstone® 100HS (also known as Capstone® ST-100HS), Capstone® 110 (also known as Capstone® ST-110), cationic polydialkylsiloxanes and polydimethylsiloxanes (PDMS) (such as Silquat®) or combinations thereof. Flexisperse™ HQ-30 (ICT) is a water soluble acrylic based cationic polymer. Capstone® 100HS, Capstone® 110 (DuPont) are both water soluble fluorinated polycations. Silquat® includes a series of cationic silicone quaternary polymers and compounds. In one embodiment, the cationic compound is Capstone® 110.

In some embodiments, the passivation layer is formed by depositing the cationic compound onto the conductive coating layer. In some such embodiments, the cationic compound is deposited to the conductive coating layer by dip coating or spray coating. In some other embodiments, the passivation layer is formed in situ during sample analysis when passing a sample fluid mixed with the cationic compound through the microchannels, microtracks or micropaths.

In any embodiments described herein, the microfluidic device may comprise one or more passivation layers. In some embodiments, the microfluidic device comprises two passivation layers.

Methods of Manufacturing

FIG. 1 illustrates an example of a digital microfluidic cartridge 100 of the present disclosure. The cartridge comprises a molded plastic top plate 101, a conductive coating layer 102, two hydrophobic coating layers (103 and 105) with aqueous-immiscible filler fluid 104 filled in between the two hydrophobic coating layers, a dielectric coating layer 106 and a printed circuit board 107 on the bottom. The conductive coating layer can be prepared from indium tin oxide (ITO) or one or more polymer blends, such as PEDOT:PSS. In some embodiments, the hydrophobic coating layer used in the cartridge is CYTOP, which is a fluorinated hydrocarbon polymer. In some instances, the PEDOT:PSS conductive layer is spray coated and cured when deposited. One purpose of including PSS in the conductive coating layer is to increase the solubility of PEDOT for deposition.

Conductive Coating Layer

As explained above, conductive coating layer 102 may be formed using a conductive ink material. Conductive inks are sometimes referred to in the art as polymer thick films (PTF). Conductive inks typically include a polymer binder, conductive phase and the solvent phase. When combined, the resultant composition can be printed onto other materials. Thus, according to the invention, conductive coating layer 102 may be formed using a conductive ink which is printed onto top plate 101. The conductive inks or polymers can be applied to the microfluidic device by different techniques. U.S. Pat. No. 7,005,179 describes a variety of ways for applying, patterning, curing conductive inks on silicone substrates, which is hereby incorporated by reference in its entirety.

The conductive ink may be a transparent conductive ink. The conductive ink may be a substantially transparent conductive ink. The conductive ink may be selected to transmit electromagnetic radiation (EMR) in a predetermined range of wavelengths. Transmitted EMR may include EMR signal indicative of an assay result. The conductive ink may be selected to filter out EMR in a predetermined range of wavelengths. Filtered EMR may include EMR signal that interferes with measurement of an assay result. The conductive ink may be sufficiently transparent to transmit sufficient EMR to achieve a particular purpose, such as sensing sufficient EMR from an assay to make a quantitative and/or qualitative assessment of the results of the assay within parameters acceptable in the art given the type of assay being performed. Where the layered structure is used as a component of a microfluidic device, and the microfluidic device is used to conduct an assay which produces EMR as a signal indicative of quantity and/or quality of a target substance, the conductive ink may be selected to permit transmission of a sufficient amount of the desired signal in order to achieve the desired purpose of the assay, i.e. a qualitative and/or quantitative measurement through the conductive ink layer of EMR corresponding to target substance in the droplet.

The conductive ink may be sufficiently transparent to permit a sensor to sense from an assay droplet at least 50% of EMR within a target wavelength range which is directed towards the sensor. The conductive ink may be sufficiently transparent to permit a sensor to sense from an assay droplet at least 5% of EMR within a target wavelength range which is directed towards the sensor. The conductive ink may be sufficiently transparent to permit a sensor to sense from an assay droplet at least 90% of EMR within a target wavelength range which is directed towards the sensor. The conductive ink may be sufficiently transparent to permit a sensor to sense from an assay droplet at least 99% of EMR within a target wavelength range which is directed towards the sensor.

A particular microfluidic device may employ multiple conductive inks in different detection regions, such that in one region, one set of one or more signals may be transmitted through the conductive ink and therefore detected, while another set of one or more signals is blocked in that region. Two or more of such regions may be established that block and transmit selected sets of electromagnetic wavelengths. Moreover, where a substrate is used that produces background EMR, conductive inks may be selected on an opposite substrate to block the background energy while permitting transmission of the desired signal from the assay droplet. For example, conductive coating layer 102 may be selected to block background EMR from the bottom substrate. The bottom substrate may comprise a dielectric coating layer 106, a conductive coating layer and a printed circuit board 107 on the bottom.

Conductive inks may be employed together with non-conductive inks in order to create a pattern of conductive and non-conductive regions with various optical properties established by the inks. For example, EMR transmitting (e.g., transparent, translucent) conductive inks may be used in a region where detection of EMR through the ink is desired, while EMR blocking (e.g., opaque, ink that filters certain bandwidths) conductive and/or non-conductive inks may be used in a region where detection is not desired in order to control or reduce background EMR. Moreover, conductive inks may be patterned in a manner which permits a droplet to remain in contact with the conductive ink while leaving an opening in the conductive ink for transmission of EMR.

Examples of suitable conductive inks include intrinsically conductive polymers. Examples include CLEVIOS™ PEDOT:PSS (Heraeus Group, Hanau, Germany) and BAYTRON® polymers (Bayer AG, Leverkusen, Germany. Examples of suitable inks in the CLEVIOS™ line include inks formulated for inkjet printing, such as P JET N, P JET HC, P JET N V2, and P JET HC V2. Other conductive inks are available from Orgacon, such as Orgacon PeDot 305+.

The conductive coating layer 102 may be printed on the surface of top plate 101 and/or bottom substrate. The ink may be patterned to create electrical features, such as electrodes, sensors, grounds, wires, etc. The pattern of the printing may bring the conductive ink into contact with other electrical conductors for controlling the electrical state of the conductive ink electrical elements.

In some embodiments, top plate 101 includes openings for pipetting liquid through the top plate 101 into a droplet operations gap. Openings are positioned in proximity to reservoir electrodes situated on the bottom substrate and arranged in association with other electrodes for conducting droplet dispensing operations. Top plate 101 also includes reservoirs. Reservoirs are molded into top plate, and are formed as wells in which liquid can be stored. Reservoirs include openings, which provide a fluid passage for flowing liquid from reservoirs through top plate into a droplet operations gap. Openings are arranged to slow liquid through top plate 101 and into proximity with one or more droplet dispensing electrodes associated with a bottom substrate. Top plate 101 may be coated with a conductive ink reference electrode patterned on a bottom surface of top plate 101 so that the conductive ink reference electrode faces the droplet operations gap. In this manner, droplets in the droplet operations gap can be exposed to the reference electrode. The reference electrode pattern is designed to align with electrodes and electrode pathways on the bottom substrate. Reference electrode also includes a connecting portion, which is used to connect reference electrode to a source of reference potential, e.g. a ground electrode.

In one embodiment, the reference electrode pathways overlie and have substantially the same width as electrode pathways on the bottom substrate. This arrangement provides for improved impedance detection of droplets in the droplet operation gap. Impedance across the droplet operations gap from one of more electrodes on the bottom substrate to the reference electrode pathway may be detected in order to determine various factors associated with the gap, such as whether droplet is situated between the bottom electrode and the reference electrode, to what extent droplet is situated between the bottom electrode and the reference electrode, the contents of a droplet situated between the bottom of electrode and the reference electrode, whether oil has filled the gap between the bottom electrode and the reference electrode, electrical properties of the droplet situated between the bottom electrode and the reference electrode, and electrical properties of the oil situated between the bottom electrode and the reference electrode.

In one embodiment, a conductive coating layer such as a layer of conductive ink is patterned on top plate 101 and/or the bottom substrate to form an arrangement of electrode suitable for conducting one or more droplet operations. In one embodiment, the droplet operations are electrowetting-mediated droplet operations. In another embodiment, the droplet operations are dielectrophoresis-mediated droplet operations.

In one embodiment, the substrate is subject to a corona treatment prior to application of the conductive ink. For example, the corona treatment may be conducted using a high-frequency spot generator, such as the SpotTec™ spot generator (Tantec A/S, Lunderskov, Denmark). In another embodiment, the substrate is subject to plasma treatment prior to application of the conductive ink.

Dielectric Layer

In some embodiments, the layered structure will also include a dielectric layer. A dielectric layer is useful, for example, when the conductive ink is patterned to form electrodes for conducting droplet operations. For example, the droplet operations may be electrowetting-mediated droplet operations or dielectrophoresis-mediated droplet operations. In some embodiments, the bottom substrate includes dielectric layer 106 layered atop a patterned conductive layer (not shown in FIG. 1), which may be a conductive ink layer. Various materials are suitable for use as the dielectric layer. Examples include: vapor deposited dielectric, such as PARYLENE™ C (especially on glass) and PARYLENE™ N (available from Parylene Coating Services, Inc., Katy, Tex.); TEFLON® AF coatings; cytop; soldermasks, such as liquid photoimageable soldermasks (e.g., on PCB) like TAIYO™ PSR4000 series, TAIYO™ PSR and AUS series (available from Taiyo America, Inc. Carson City, Nev.) (good thermal characteristics for applications involving thermal control), and PROBIMER™ 8165 (good thermal characteristics for applications involving thermal control (available from Huntsman Advanced Materials Americas Inc., Los Angeles, Calif.); dry film soldermask, such as those in the VACREL® dry film soldermask line (available from DuPont, Wilmington, Del.); film dielectrics, such as polyimide film (e.g., KAPTON® polyimide film, available from DuPont, Wilmington, Del.), polyethylene, and fluoropolymers (e.g., FEP), polytetrafluoroethylene; polyester; polyethylene naphthalate; cyclo-olefin copolymer (COC); cyclo-olefin polymer (COP); any other PCB substrate material listed above; black matrix resin; and polypropylene.

Hydrophobic Layer

As illustrated in FIG. 1, a hydrophobic layer 103 may be deposited on a conductive coating layer 102. Similarly, a hydrophobic layer 105 may be deposited atop dielectric layer 105. It will be appreciated that where the conductive ink layer and/or the dielectric layer is patterned, the hydrophobic layer may cover the conductive ink layer in some regions while covering the dielectric layer or even the base layer and other regions of the substrate. Focusing here on the conductive ink layer, the conductive ink layer may be derivatized with low surface-energy materials or chemistries, e.g., by deposition or using in situ synthesis using compounds such as poly- or per-fluorinated compounds in solution or polymerizable monomers. Examples include TEFLON® AF (available from DuPont, Wilmington, Del.), members of the CYTOP family of materials, coatings in the FLUOROPEL® family of hydrophobic and superhydrophobic coatings (available from Cytonix Corporation, Beltsville, Md.), silane coatings, fluorosilane coatings, hydrophobic phosphonate derivatives (e.g., those sold by Aculon, Inc), and NOVEC™ electronic coatings (available from 3M Company, St. Paul, Minn.), and other fluorinated monomers for plasma-enhanced chemical vapor deposition (PECVD). In some cases, the hydrophobic coating may have a thickness ranging from about 10 nm to about 1,000 nm.

Some embodiments of the present application are directed to methods of manufacturing a microfluidic device to prevent sample contamination from PSS during sample analysis by providing a microfluidic device that has been manufactured and forming a passivation layer immediately adjacent to the conductive coating layer, wherein the passivation layer is composed of a water-insoluble material that prevents leaching of the conductive coating layer polymers into a sample fluid that move through the device. The passivation layer is formed by depositing a cationic compound to the conductive coating layer.

In some embodiments, forming the passivation layer includes coating the conductive layer with the cationic compound to form a complex of the polymer of the conductive coating layer with the cationic compound. In some embodiments, forming the passivation layer includes depositing the cationic compound by spray coating. In some embodiments, forming the passivation layer comprises depositing the cationic compound to the conductive coating layer with at least one, two, three, four, five, or six layers of spray coatings.

In some embodiments, forming the passivation layer comprises spray coating the conductive layer with a cationic compound having a concentration of about 0.1% to about 10%, about 0.5% to about 5%, or about 0.5% to about 3%, by weight based on the total weight of the spray solution. In some embodiments, forming the passivation layer comprises spray coating the conductive layer with the cationic compound having a concentration of about 0.1%, 0.2%, 0.5%, 1.0%, 1.5%, 2%, 2.5%, 3%, 4%, 5%, 6%, 7%, 8%, 9%, or 10% by weight, based on the total weight of the spray solution. In some embodiments, forming the passivation layer comprises spray coating the conductive layer with the cationic compound having a concentration of about 1% or 2% by weight, based on the total weight of the spray solution.

Depositing the cationic compound can include spray coating the cationic compound with a spray solvent. In some embodiments, the spray solvent comprises one or more organic solvent and water. In some embodiments, the spray solvent comprises a mixture of an alcohol and water. In some embodiments, the spray solvent comprises a mixture of ethanol and water. In some embodiments, the ratio of ethanol to water by volume in the spray solvent is in the range of about 1:1 to about 8:1, about 1:1 to about 6:1, about 2:1 to about 5:1. In some embodiments, the ratio of ethanol to water by volume in the spray solvent is about 4:1.

In some embodiments, forming the passivation layer includes removing excess cationic polymer used during coating. In some embodiments, removing the excess cationic polymer comprises washing with a rinsing solvent. In some embodiments, removing the excess cationic polymer comprises washing with a rinsing solvent for about 5 mins to about 60 mins, for about 10 mins to about 40 mins, or for about 15 mins to about 25 mins. In some embodiments, removing the excess cationic polymer comprises washing with a rinsing solvent for about 20 mins.

In some embodiments, the rinsing solvent is water. In some embodiments, the rinsing solvent is a mixture of water and one or more organic solvent. In some embodiments, the rinsing solvent is a mixture of ethanol and water. In some embodiments, the rinsing solvent is a mixture of ethanol and water, wherein the ratio of ethanol to water by volume is about 1.1 to about 4:1.

In some embodiments, the method includes applying a hydrophobic coating to the passivation layer. In some embodiments, the method further comprises forming one or more microchannels, microtracks or micropaths within the device. In some such embodiments, the method further comprises forming one or more microtracks or micropaths of electrode within the device.

In some embodiments, the microfluidic device is a digital microfluidic device that employs mechanisms selected from electrowetting, opto-electrowetting, electrostatic, electrophoretic, dielectrophoretic, electro-osmotic, or combinations thereof. In one embodiment, the digital microfluidic device employs an electrowetting mechanism.

In some embodiments, the method further comprises removing excess cationic polymer from the passivation layer. In some such embodiments, excess cationic polymer is removed by rinsing with water. In some other embodiments, excess cationic polymer is removed via sonication or ultra-sonication.

In some embodiments, the conductive coating layer comprises one or more conductive inks or a conductive polymer. In some such embodiment, the conductive coating layer is patterned. In some embodiments, the conductive coating layer is grounded or floated or serves as a receptor of electrons. In some further embodiments, the conductive coating layer is patterned to form electrodes. For example, it can be patterned to form electrowetting electrodes, or a ground on the top plate that reflects the pattern of electrowetting electrodes on the bottom substrate, or a ground on the bottom plate adjacent the electrowetting electrodes, or a series of sensors.

In some embodiments, the water-insoluble material of the passivation layer comprises a complex of the polymer of the conductive coating layer with a cationic compound. In some further embodiments, the water-insoluble material of the passivation layer comprises the complex of a polyanion with a cationic compound. In some further embodiments, the polyanion is selected from polystyrene sulfonic acid or polystyrene sulfonate.

In some embodiments, the conductive coating layer comprises poly(3,4-ethylenedioxythiophene) (PEDOT).

In any embodiments of the methods described herein, one or more passivation layers can be formed by repeating the passivation layer forming step.

Figure 2:
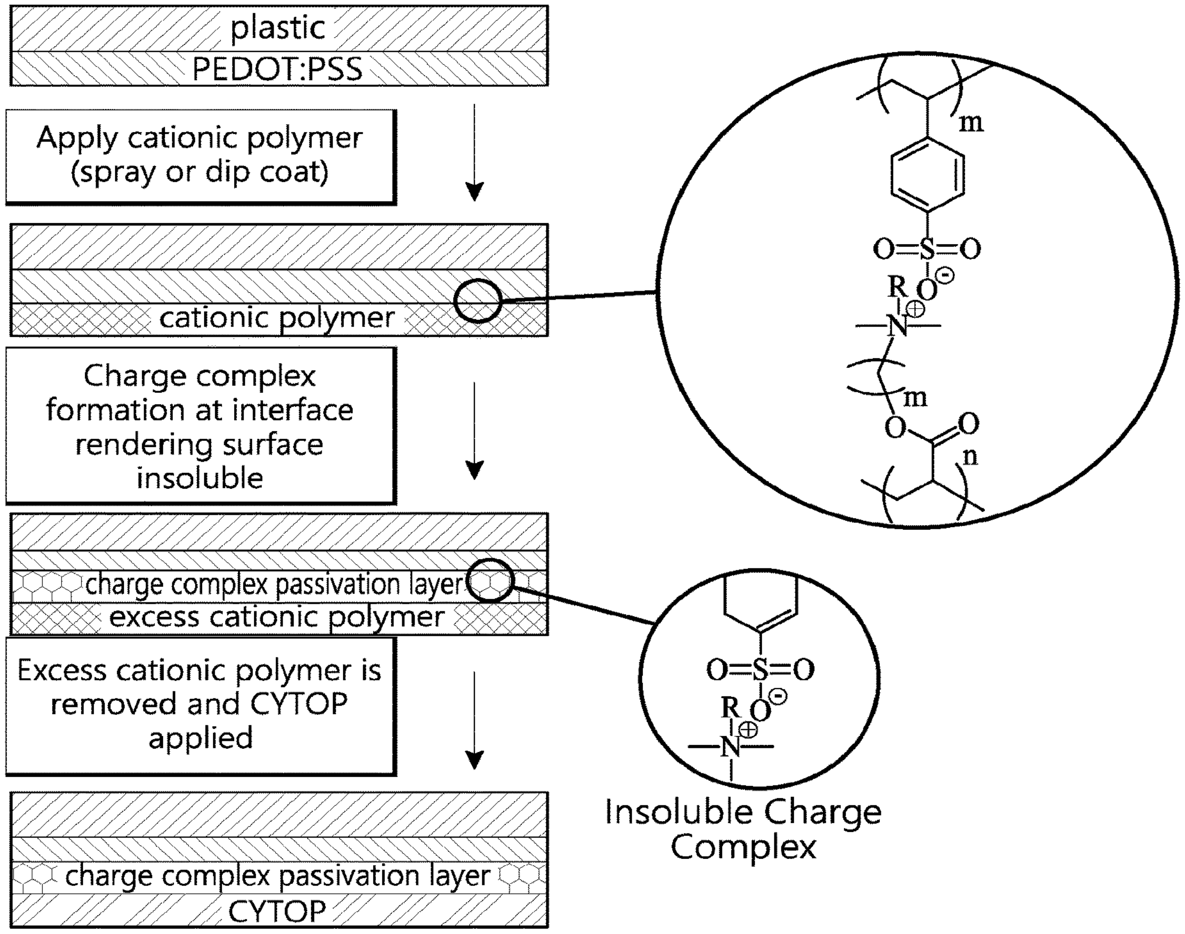
FIG. 2 is a flow chart depicting the formation of a passivation layer during the microfluidic device cartridge manufacturing process to prevent polystyrene sulfonic acid (PSS) leaching.

FIG. 2 is a flow chart illustrating one embodiment of the microfluidic cartridge assembly methods disclosed herein where a passivation layer is applied to the PEDOT:PSS conductive coating layer to prevent the leaching of PSS. First, a conductive coating layer made of PEDOT:PSS is deposited on the top plate of the cartridge. Then, a cationic polymer is applied to the conductive coating layer via a standard coating method, such as spray or dip coating. The cationic polymer forms a water-insoluble complex with PSS at the interface of the conductive coating layer. Subsequently, excess cationic polymer is removed by rinsing off via sonication. The rinsing step is critical since excess cationic material is potentially detrimental to enzyme activity. Finally, the cartridge was returned for continued assembly, including depositing a hydrophobic coating layer CYTOP on the passivation layer. The passivation layer can help prevent PSS leaching and also function as an adhesion layer for CYTOP.

Methods of In Situ Leak Sealing

Some embodiments of the present application are directed to methods of preventing sample contamination during sample analysis using a microfluidic device, comprising: mixing a cationic compound with a sample fluid; providing a microfluidic device comprising a top plate, a conductive coating layer comprising one or more polymers, one or more hydrophobic coating layers, and one or more microchannels, microtracks or micropaths, wherein the microchannels, microtracks or micropaths contain or are immersed in a filler fluid that is immiscible with the sample fluid; passing the sample fluid through the microchannels, microtracks or micropaths such that the cationic polymer in the sample fluid forms a passivation layer immediately adjacent to the conductive coating layer; and wherein the passivation layer comprises a water-insoluble material to prevent the leaching of the conductive coating layer polymers into the sample fluid.

In some embodiments, the conductive coating layer comprises one or more conductive inks or conductive polymers. In some such embodiment, the conductive coating layer is patterned. In some embodiments, the conductive coating layer is grounded or floated or serves as a receptor of electrons. In some further embodiments, the conductive coating layer is patterned to form electrodes. For example, it can be patterned to form electrowetting electrodes, or a ground on the top plate that reflects the pattern of electrowetting electrodes on the bottom substrate, or a ground on the bottom plate adjacent the electrowetting electrodes, or a series of sensors.

In some embodiments, the water-insoluble material of the passivation layer comprises a complex of the polymer of the conductive coating layer with a cationic compound. In some further embodiments, the water-insoluble material of the passivation layer comprises the complex of a polyanion with a cationic compound. In some further embodiments, the polyanion is selected from polystyrene sulfonic acid or polystyrene sulfonate. In some embodiments, the conductive coating layer comprises poly(3,4-ethylenedioxythiophene) (PEDOT).

In any embodiments of the methods described herein, one or more passivation layers can be formed by repeating the method multiple times.

Figure 3:
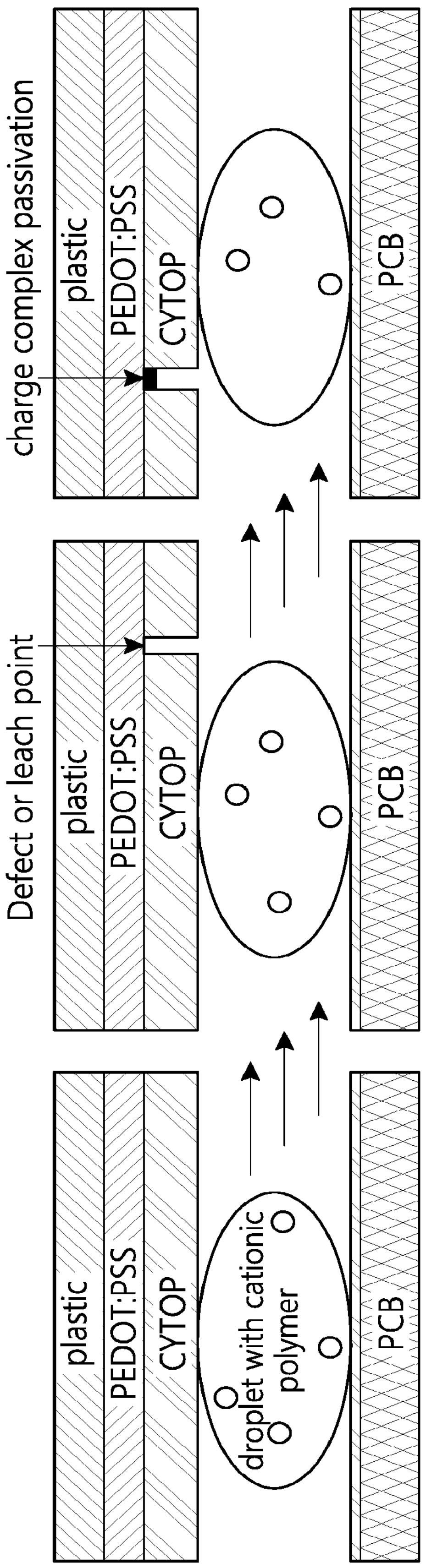
FIG. 3 is a flow chart depicting the in situ formation of a passivation layer during microfluidic device sample processing to prevent polystyrene sulfonic acid (PSS) leaching.

FIG. 3 is a flow chart illustrating one embodiment of the in situ PSS leak sealing methods described herein. First, a cationic polymer is mixed with a sample fluid. If a defect or leach point exists in the hydrophobic coating layer CYTOP, PSS from the underlying conductive coating layer will leach out during the sample analysis when droplets of the sample fluid is passing through the microchannels, microtracks or micropaths of the microfluidic devices. The cationic polymer in the sample fluid will then react with the PSS in the defect or leach point, forming a water-insoluble passivation layer to seal the defect or leach point.

Methods of Reducing Enzyme Inhibition in Sample Analysis

Some embodiments of the present application are directed to methods of reducing enzyme inhibition in a sample analysis using a microfluidic device comprising: providing a microfluidic device described herein, wherein said microfluidic device comprises a passivation layer; conducting sample analysis using a sample assay comprising one or more enzymes; wherein the enzyme inhibition is reduced relative to the use of a microfluidic device without a passivation layer.

In some embodiments, the sample assay comprises PCR and sequencing enzymes. In some such embodiments, the sample assay comprises one or more enzymes selected from polymerases or transposases. In some further embodiments, the enzymes are selected from Phusion II HS, USER (LMX1), DisplaceAce DNA Pol, Fpg (LMX2), UvsX (filament form), BSU DNA polymerase, Creatine Kinase, or GP32 ssDNA BP.

EXAMPLES

Additional embodiments are disclosed in further detail in the following examples, which are not in any way intended to limit the scope of the claims.

Example 1

A solution based test on the formation of a water-insoluble complex was conducted. Three cationic compounds—Flexisperse™ HQ-30, Capstone® 100HS and Capstone® 110 were tested. Each of these cationic compounds (1% cationic polymer; 250 μL) were mixed with PSS (1% PSS; 250 μL) in various aqueous solutions including water, an acidic buffer (pH=2), an alkaline buffer (pH=11), or 0.5 M NaCl solutions in a vial respectively. In all cases, water-insoluble complexes were formed and precipitated to the bottom of the vial. The formation of these insoluble complexes is instantaneous and robust, critical for the formation of a passivation layer. The vials containing the precipitate were stored for a month and the precipitates remained.

Table 1 provides a summary of the solubility testing of several cationic polymers and PSS.

TABLE 1

Solubility results when 1% cationic polymer (250 μL) mixed with 1% PSS (250 μL)

| | Water | pH 2 Buffer | 0.5M NaCl | 0.01% Tween |
|---|---|---|---|---|
| Flexiwet Q-22 (fluorinated surfactant) | Insoluble | Soluble | Soluble | Soluble |
| Flexisperse ™ HQ-30 | Insoluble | Insoluble | Insoluble | Insoluble |
| Capstone ® 110 | Insoluble | Insoluble | Insoluble | Insoluble |
| Capstone ® 100HS | Insoluble | Insoluble | Insoluble | Insoluble |

Example 2

A proof-of-concept experiment was conducted on a glass slide to test the stability of the formation of a passivation layer on top of a conductive coating layer. First, PEDOT:PSS (0.5 mL) was spun casted on a plasma cleaned glass slide [500 rpm: 100 sec dwell 1000 rpm:60 sec dwell] to form a conductive coating layer. The coated glass slide was dried and cured for 30 minutes at 120° C. on a hotplate. Subsequently, a 1% solution (1:1 EtOH:$H_2O$) of Capstone® 110 was either dipped or spray coated on top of the PEDOT:PSS conductive coating layer and dried for at least 5 minutes at 100° C. Then, the resulting slide was immersed in water or the alkaline buffer (pH=11). It was observed that the glass slide surface became opaque after cationic polymer exposure and the opaque substance was not water soluble. It was concluded that the cationic passivation may lead to stable surfaces.

Example 3

An experiment was conducted to test the in situ surface passivation method disclosed in FIG. 3. The objective of the in situ surface passivation is to heal defects and leach points in cartridges with cationic polymer reagents during sample runs. In this cartridge stress test experiment, the microfluidic cartridges were run with a series of sequential stressed runs with different cationic compound solutions: (1) 1% Flexisperse™ HQ-30 in 0.01% Tween, (2) 0.01% Tween wash 1, and (3) 0.01% Tween wash 2. Between runs the cartridge was drained, cleaned with isopropyl alcohol (IPA), and dried under Nz. After the series of stress runs was completed, there was an observable benefit of using Flexisperse™ HQ-30 to help seal leak sites. The leak sealing method prevented PSS leaching for at least 1 wash cycle (109 mP, essentially baseline for this assay). By the 2nd wash cycle PSS leaching levels increased. The return of PSS leaching was attributed to new pores or cracks forming during the stress test. The in situ PSS leak passivation experimental results is summarized in Table 2 below.

Figure 4A:
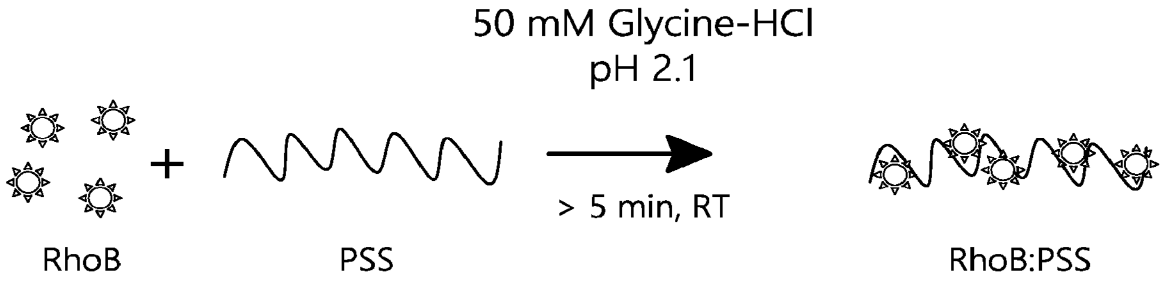
FIG. 4A shows the preparation of a fluorescence polarization assay for quantitating PSS in sample droplets recovered from a microfluidic cartridge.
Figure 4B:
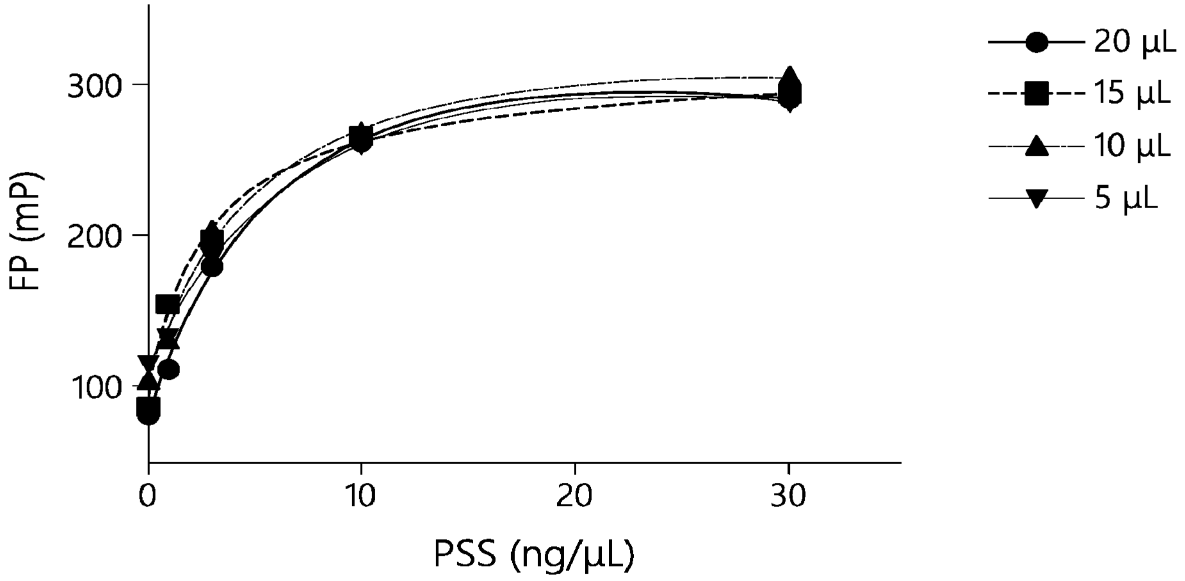
FIG. 4B shows the Rhodamine B (RhoB) PSS binding curves versus sample volume.
Figure 5:
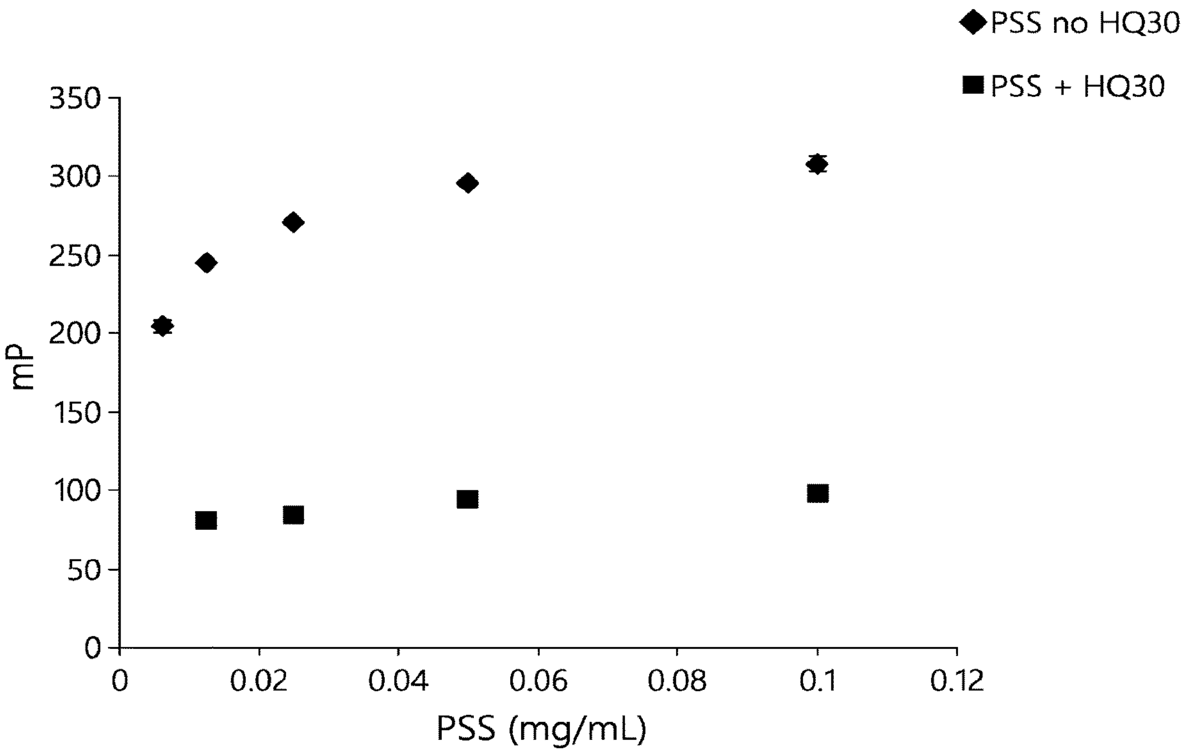
FIG. 5 shows a titration chart of RhoB/PSS assay comparing the assay with or without equal amounts of Flexisperse™ HQ-30 present with PSS.

PSS leaching amounts were determined using fluorescence polarization of a RhoB:PSS binding assay. The RhoB:PSS assay was used to measure the concentration of PSS in the recovered sample fluid or aliquots for measuring PSS leaching (see FIGS. 4A and 4B). The reaction mechanism is illustrated in FIG. 4A. RhoB is a fluorescent dye often used as a tracer dye in a water or aqueous system. RhoB and PSS readily form a complex when they are dissolved in a glycine-HCl solution (pH=2.1) at room temperature. The RhoB assay has a sensitivity of less than 1 ng/μL of PSS and this assay is compatible with low recovery sample fluid volumes from cartridges (FIG. 4B shows the RhoB PSS binding curves at various PSS volumes). The PSS concentration curve in FIG. 5 clearly shows that Flexisperse™ HQ-30 has a stronger binding affinity toward PSS than RhoB.

TABLE 2

In situ PSS leak passivation experimental results

| Condition | FP Average (mP) | mP (std) | PSS (ng/μL) |
|---|---|---|---|
| Flexisperse ™ HQ-30 | 77.36 | 2.76 | <,0.01 |
| Wash 1 | 109.87 | 1.93 | <0.01 |
| Wash 2 | 252.28 | 1.94 | 20 |

Example 4

An experiment was conducted to test several cationic compounds treated conductive coating layer following the method disclosed in FIG. 2. Since the water-insoluble complex forms immediately at the interface of the conductive coating layer, there is little impact on the conducting qualities of the film. A standard microfluidic cartridge exemplified in FIG. 1 was assembled. After the PEDOT:PSS conductive coating layer is cured, different cationic compounds were deposited on the conductive coating layer via ultrasonic spray coating [coating condition: spray width 15 mm; head speed 100 mm/sec; flow rate 1 mL/min; solid % 0.25%; wet thickness 10 μm; dry thickness 25 nm]. Excess cationic compounds were rinsed away using EtOH:$H_2O$ (4:1) solvent mixture while the PSS:cationic compound complex remained intact as it is insoluble in EtOH:$H_2O$ (4:1) solvent. The solubility of the cationic compounds and PSS:cationic compound complex were predetermined to ensure that the cationic compounds are soluble in this rinse mixture and PSS:cationic compound complex is insoluble in this mixture. Table 3 summarizes the cartridge coating conditions of the cationic compounds, loading reagents, wash procedure, and observation during cartridge runs.

TABLE 3

| Cartridge | Coating Type | # Coatings | Est. Thick. (nm) | Wash (4:1 EtOH:$H_2O$) | Dry (100° C., 10 min) | Wash (4:1 EtOH:$H_2O$) | Dry (100° C., 10 min) | Electrowetting Parameters | Buffer/Loading Condition |
|---|---|---|---|---|---|---|---|---|---|
| A | none | 0 | 0 | no | yes | yes | yes | 70 C., 2 hr, 300 V | 0.01% Tween, E7 (50 mL), A1-8 (25 mL) |
| B | HQ-30 | 1 | 25 | no | yes | yes | yes | 70 C., 2 hr, 300 V | 0.01% Tween, E7 (50 mL), A1-8 (25 mL) |
| C | HQ-30 | 2 | 50 | no | yes | yes | yes | 70 C., 2 hr, 300 V | 0.01% Tween, E7 (50 mL), A1-8 (25 mL) |

TABLE 3-continued

| Cartridge | Coating Type | # Coatings | Est. Thick. (nm) | Wash (4:1 EtOH:$H_2O$) | Dry (100° C., 10 min) | Wash (4:1 EtOH:$H_2O$) | Dry (100° C., 10 min) | Electrowetting Parameters | Buffer/Loading Condition |
|---|---|---|---|---|---|---|---|---|---|
| D | HQ-30 | 2 | 50 | yes | yes | yes | yes | 70 C., 2 hr, 300 V | 0.01% Tween, E7 (50 mL), A1-8 (25 mL) |
| E | Capstone 110 | 1 | 25 | no | yes | yes | yes | 70 C., 2 hr, 300 V | 0.01% Tween, E7 (50 mL), A1-8 (25 mL) |
| F | Capstone 110 | 2 | 50 | no | yes | yes | yes | 70 C., 2 hr, 300 V | 0.01% Tween, E7 (50 mL), A1-8 (25 mL) |
| G | Capstone 100HS | 1 | 25 | no | yes | yes | yes | 70 C., 2 hr, 300 V | 0.01% Tween, E7 (50 mL), A1-8 (25 mL) |
| H | Capstone 100HS | 2 | 50 | no | yes | yes | yes | 70 C., 2 hr, 300 V | 0.01% Tween, E7 (50 mL), A1-8 (25 mL) |
| CTRL 1 | none | n/a | | | | | | 70 C., 2 hr, 300 V | 0.01% Tween, E7 (50 mL), A1-8 (25 mL) |

After cartridge electrowetting, recovered sample aliquots were collected and tested using RhoB assay. It was observed that Capstone® 110 (Cartridge # E and F) significantly reduced PSS leaching during stress testing in harsh stress testing conditions as compared to control cartridges (Cartridge A and CTRL 1). Two layers of Capstone® 110 provided the lowest PSS leaching amount. Flexisperse™ HQ-30 also exhibited a lowering effect with two layers passivation. Table 4 provides a summary of the RhoB/PSS leaching assay results.

TABLE 4

| Cartridge | FP Average (mP) | mP (std) | PSS (ng/μL) | Note |
|---|---|---|---|---|
| none | 251.89 | 1.68 | >20 | solvent washes |
| HQ30 | 252.75 | 1.88 | >20 | 1 layer |
| HQ30 | 249.91 | 2.89 | >20 | 2 layer |
| HQ30 | 172.74 | 2.33 | 13.2 | 2 layer rinse before first dry |
| Cap110 | 196.67 | 2.50 | 16.9 | 1 layer |
| Cap110 | 127.28 | 1.91 | 6.1 | 2 layer |
| Cap100HS | 226.13 | 3.34 | >20 | 1 layer |
| Cap100HS | 208.01 | 5.20 | 18.7 | 2 layer |
| CTRL | 262.19 | 0.98 | >20 | separate cartridge and lot |
| TWEEN | 88.78 | 4.70 | 0 | 0.01% Tween, not run in a cartridge |

Capstone® 110 was tested with a fluorescence polarization ssDNA binding assay using a fluorescein labeled single stranded DNA (26bpRevFAM) to determine if excess Capstone® 110 was still present in recovered sample fluid. In this ssDNA cationic polymer binding assay, a cationic polymer: 26bpRevFAM complex is readily formed by mixing a cationic polymer with 26bpRevFAM at room temperature. Fluorescence polarization of a FAM labeled single stranded DNA molecule increases when it binds to high molecular weight DNA binding proteins or cationic polymers (i.e., polylysine). Once the solution is made a plate reader with fluorescence polarization detection modes is used to measure the fluorescence polarization of FAM-ssDNA. The FAM excitation and emission wavelength are 515 nm and 520 nm, respectively.

Figure 6:
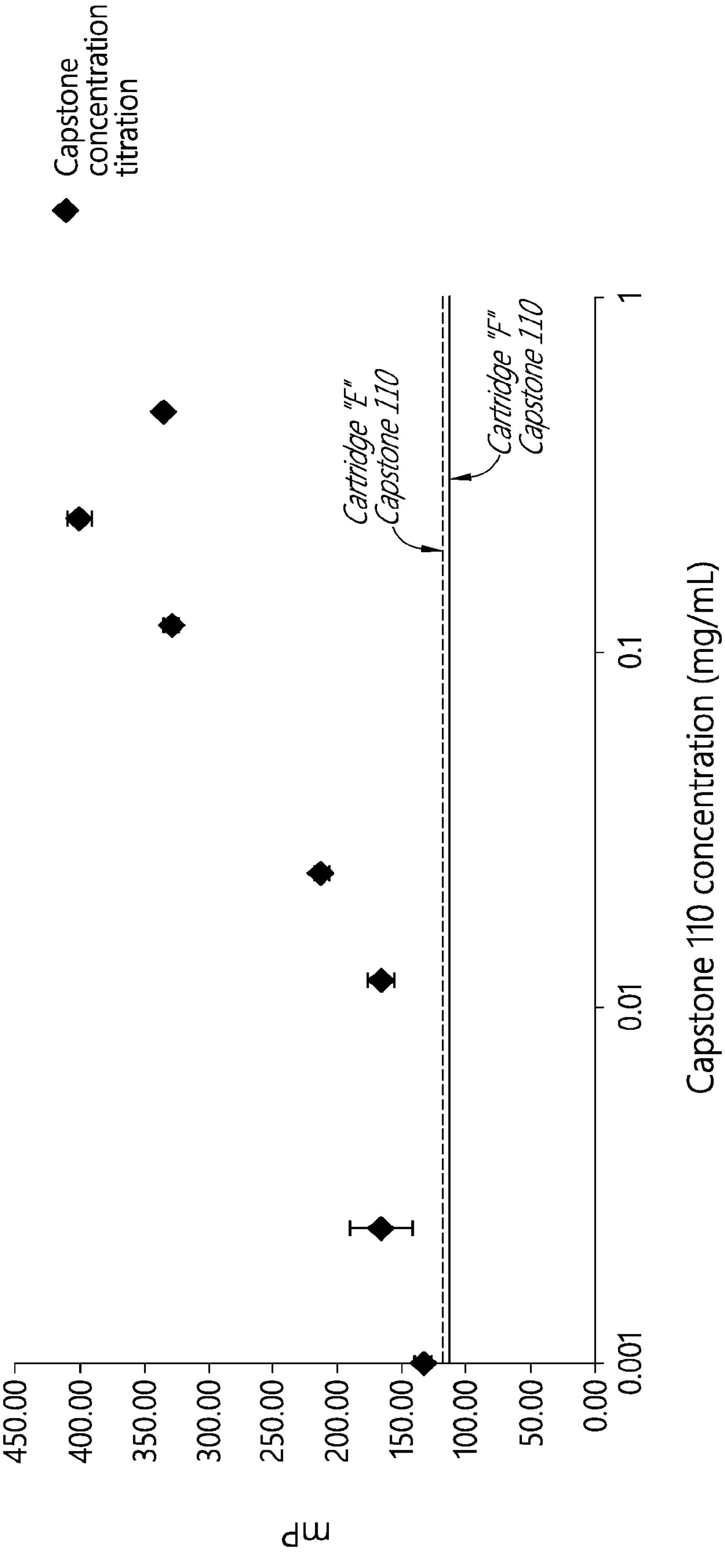
FIG. 6 is a chart showing the single stranded DNA (ssDNA) binding concentration assay with constant concentration of 26bpRevFAM (100 nM) and variation on Capstone® 110 concentration. The two arrow pointed lines represent fluorescence polarization levels of droplets recovered from microfluidic device cartridges coated with a passivation layer comprising a complex of Capstone® 110 with PSS.

Similarly, 26bpRevFAM also binds to Capstone® 110 in solution and fluorescence polarization will increase as Capstone® 110 concentration increases. In this case, 26bpRevFAM binding was not detected when it was mixed with recovered droplets from cartridges E and F (see FIG. 6). Hence, there was no observable amount of Capstone® 110 in any of the recovered droplets from cartridges E and F, which indicates the effectiveness and stability of the passivation layer formed from Capstone® 110.

In conclusion, applications of several cationic compounds to the PEDOT:PSS conductive coating layer were shown to form a passivation layer comprising water-insoluble complexes at the conductive coating layer (PEDOT:PSS) and a hydrophobic coating layer (CYTOP) interface and decreased PSS leaching significantly. In particular, Capstone® 110 was found to prevent PSS leaching significantly.

Example 5

An experiment was conducted to test the PSS leaching in a new silicone quaternary cationic polymer (Silquat®) treated conductive coating layer as compared to Capstone® 110 treated conductive coating layer. The electrowetting process was conducted in 0.05% Tween 20 buffer for 1 hour at 300 V, 80° C., 30 Hz, 5 sec transport rate. The amount of PSS in the recovered droplets was measured using RhoB: PSS FP assay as described in Example 3 and the results are summarized in Table 5 below. The results showed that Silquat® was also effective in preventing PSS leaching. It was also observed that 2 passivation layers of Capstone® 110 and PSS complex is sufficient to prevent PSS leaching and the additional layers do not provide much improvement in leaching prevention.

TABLE 5

| Coating Type | Layers | Rinse | FP avg (mP) | mP (std) | PSS (ng/μL) |
|---|---|---|---|---|---|
| Silquat | 1 | 4:1 (EtOH:$H_2O$) | 166.3 | 7.1 | 12.1 |
| Capstone-110 | 2 | no rinse | 101.7 | 4.0 | 1.9 |
| Capstone-110 | 2 | $H_2O$ | 98.7 | 4.6 | 1.4 |
| Capstone-110 | 2 | 4:1 (EtOH:$H_2O$) | 85.8 | 2.3 | 0 |
| Capstone-110 | 3 | 4:1 (EtOH:$H_2O$) | 90.7 | 1.5 | 0.2 |
| Capstone-110 | 4 | 4:1 (EtOH:$H_2O$) | 94.7 | 4.0 | 0.8 |
| Non-coated cartridge | | | 250.8 | 1.5 | >20 |
| no PSS background signal | | | 89.3 | 4.0 | 0 |

Example 6

Figure 7:
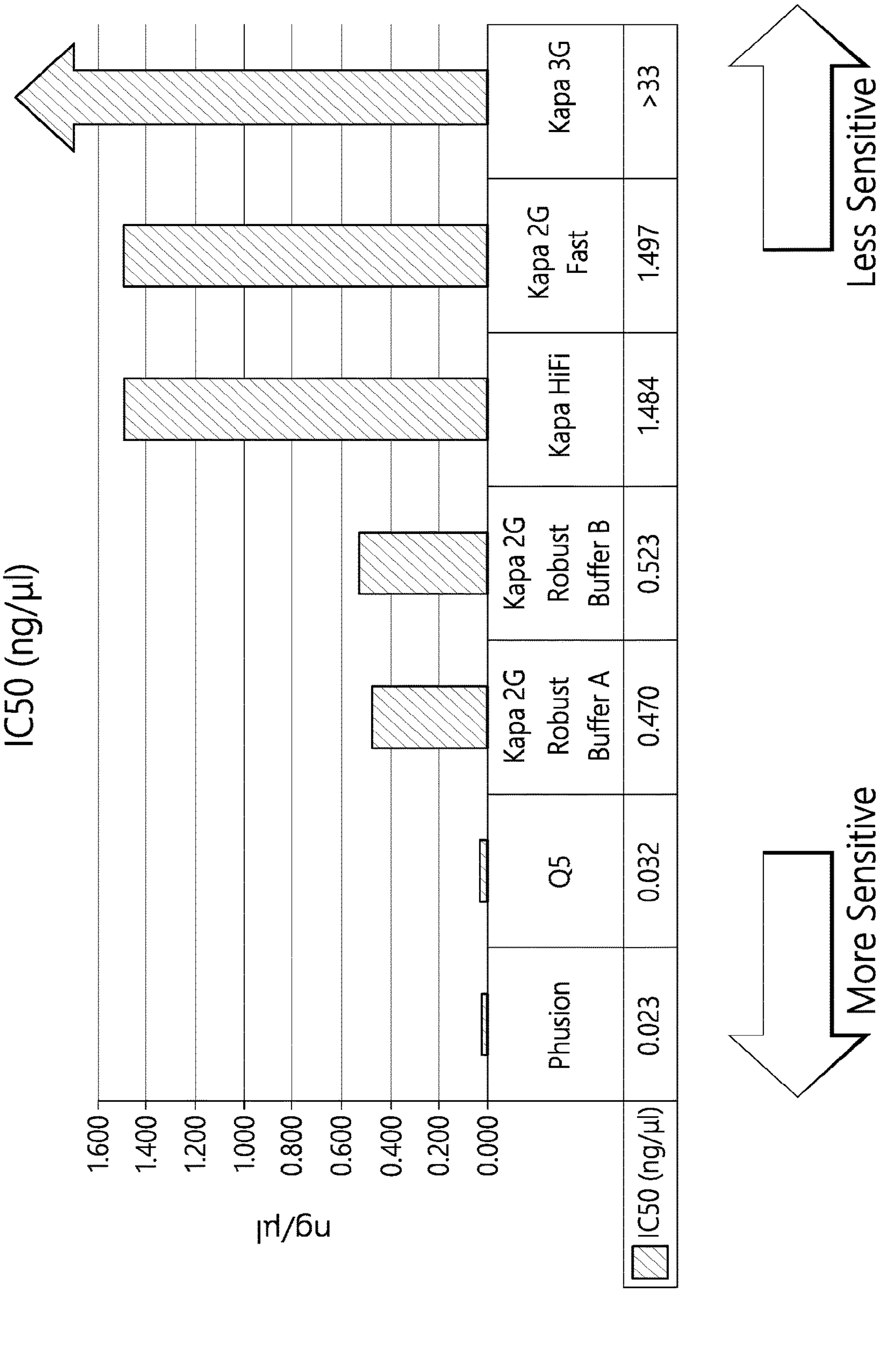
FIG. 7 is a chart showing the PSS inhibition concentration profile of various PCR polymerases.

It has been observed that several enzymes displayed varying degree of inhibition during electrowetting process on PEDOT:PSS cartridges. In contrast, the same enzymes were not inhibited on ITO cartridges. The sensitivity of various enzymes to PSS in direct enzymatic bench assays was performed and the results were summarized in Table 6 and FIG. 7. Phusion II HS, USER (LMX1) and DisplaceAce DNA polymerase are particularly sensitive to PSS and inhibition was observed at very low PSS concentrations.

TABLE 6

| Enzyme | Process | Assay | PSS $IC_{50}$ (ng/μL) |
|---|---|---|---|
| Phusion II HS | Javelin PCR | DNA Quantitation | 0.02 |
| USER (LMX1) | Linearization | Gel-Based | 0.43 |
| DisplaceAce DNA Pol | Paired End Turn | FRET (extension) | 0.84 |
| Fpg (LMX2) | PE Linearization | Gel-Based | 4.2 |
| UvsX (filament form) | ExAmp, Clustering | ADP-Glo (ATP hydrolysis) | 7.9 |
| BSU DNA polymerase | ExAmp, Clustering | FRET (extension) | 19.3 |
| Creatine Kinase | ExAmp, Clustering | ADP-Glo (ATP regeneration) | >100 |
| GP32 ssDNA BP | ExAmp, Clustering | Fluorescence Polarization | 213 |

DNA polymerase activity assay with fluorescence readout was used to measure PSS inhibition of DisplaceAce DNA polymerase. In this assay, DNA primer-template duplex labeled with fluorophore and fluorescence quencher is extended by DNA polymerase resulting in fully double stranded DNA and fluorescence signal increase. Specifically, reactions containing 0.3 uM primer/template duplex, 0.8 U/μl DisplaceAce, 100 uM dNTPs, 0.2 mg/ml BSA, 2.5 mM TCEP, 100 mM Tris-HCL pH 8.0, various concentrations of PSS initiated by addition of $MgSO_4$ (to final concentration of 10 mM) were incubated at 50° C. and fluorescence was recorded every minute over 20 minutes period. DNA duplex consisted of primer (5'-CGTAGGACTCGGAAGTCGAC-3') and fluorophore/quencher labeled template (5'-CA-GCGTGCCGTTTGCGT-(FAM) CGACTTCCGAGTC-CTACG-(Iowa Black® FQ)-3').

Figure 8A:
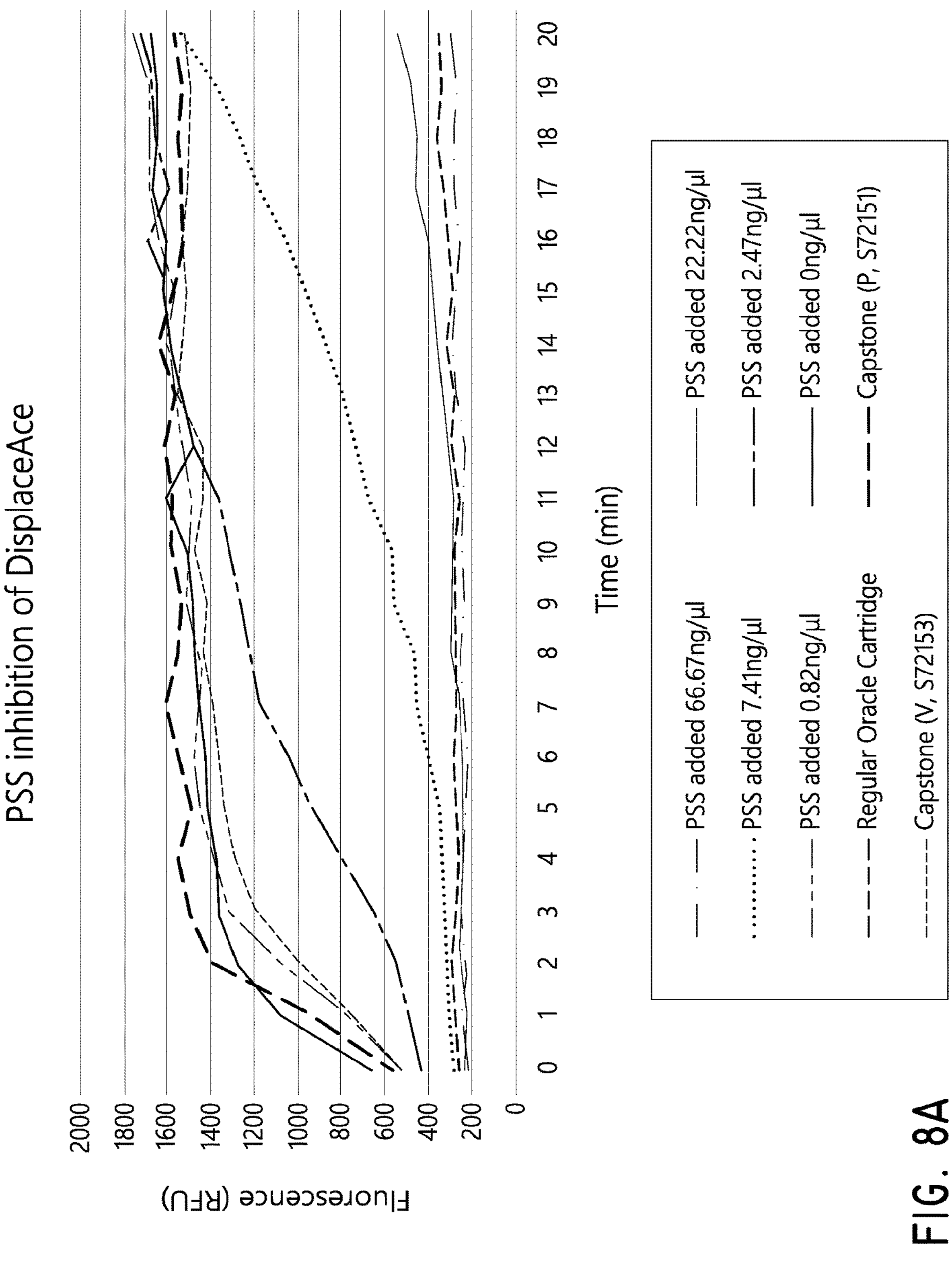
FIG. 8A is a chart showing the PSS inhibition of a DNA polymerase DisplaceAce with various concentrations of PSS added to the assay in fluidic cartridges with or without a passivation layer.

Change of fluorescence signal over time (kinetics) of DisplaceAce mediated primer extension in presence of different concentrations of PSS or cartridge eluents is shown in FIG. 8A. In FIG. 8A, the inhibition of DisplaceAce activity changes with increasing concentration of PSS added to the assay tube ranging from zero to 66.67 ng/μL PSS final concentration. It shows the inhibition of DisplaceAce with droplets recovered from a regular cartridge and the lack of inhibition of DisplaceAce with droplets recovered from two cartridges (P & V) covered with Capstone® 110.

Figure 8B:
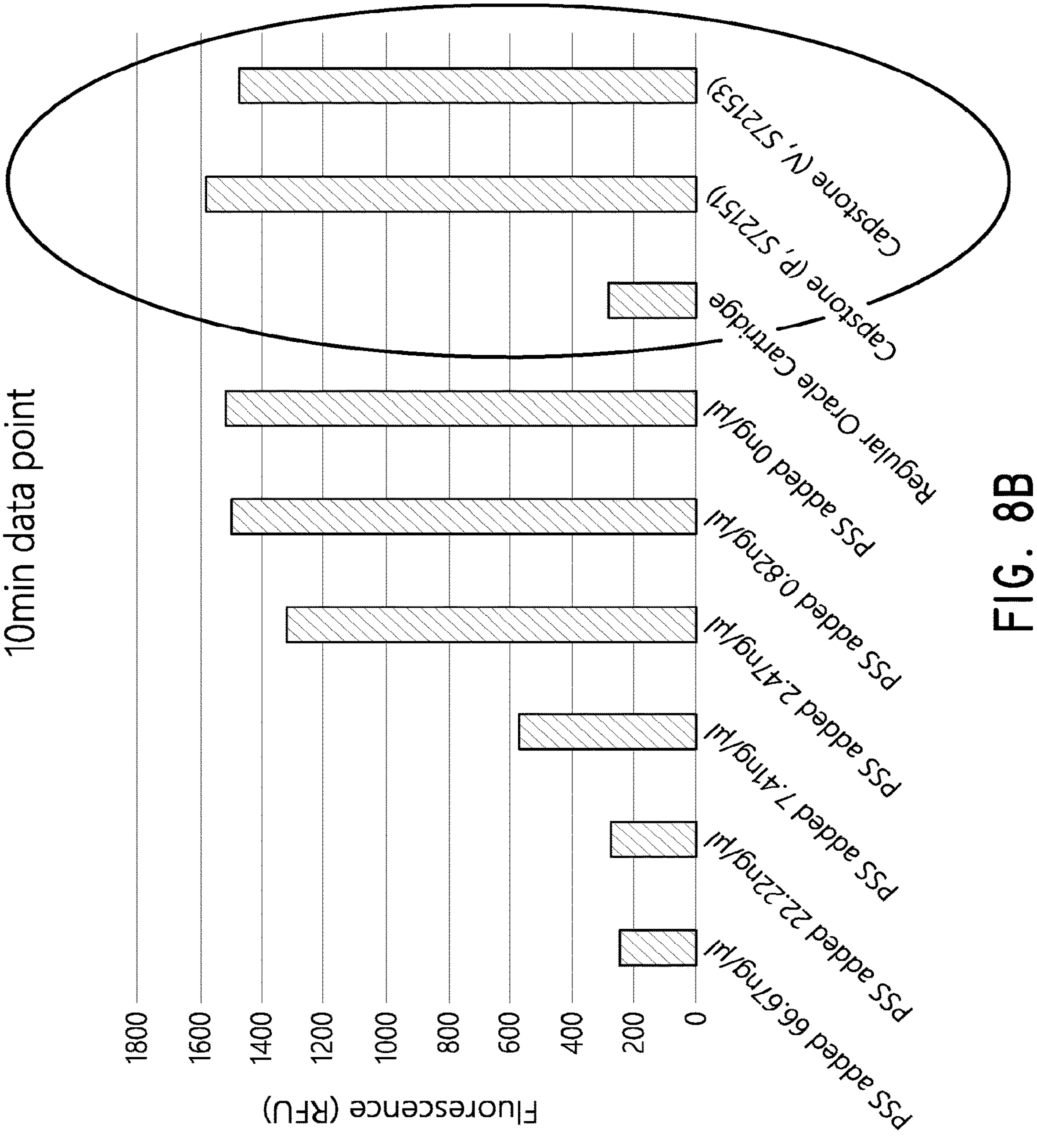
FIG. 8B is a chart summarizing the 10-minute data point of the DisplaceAce inhibitory assay described in FIG. 8A.

Fluorescence at 10 min time point of the same assay is shown in FIG. 8B. It is apparent from these measurements that PSS inhibits DisplaceAce activity, resulting in lower fluorescence signal. Furthermore eluents from PEDOT:PSS cartridges without a passivation layer (labeled Regular Cartridge on FIGS. 8A and 8B, with PSS levels >10 ng/μL) fully inhibited DisplaceAce activity in this assay while Capstone® 110 coated PEDOT:PSS cartridges (with undetectable PSS levels<1 ng/μL) did not show any measurable inhibition.

Example 7

Figure 9:
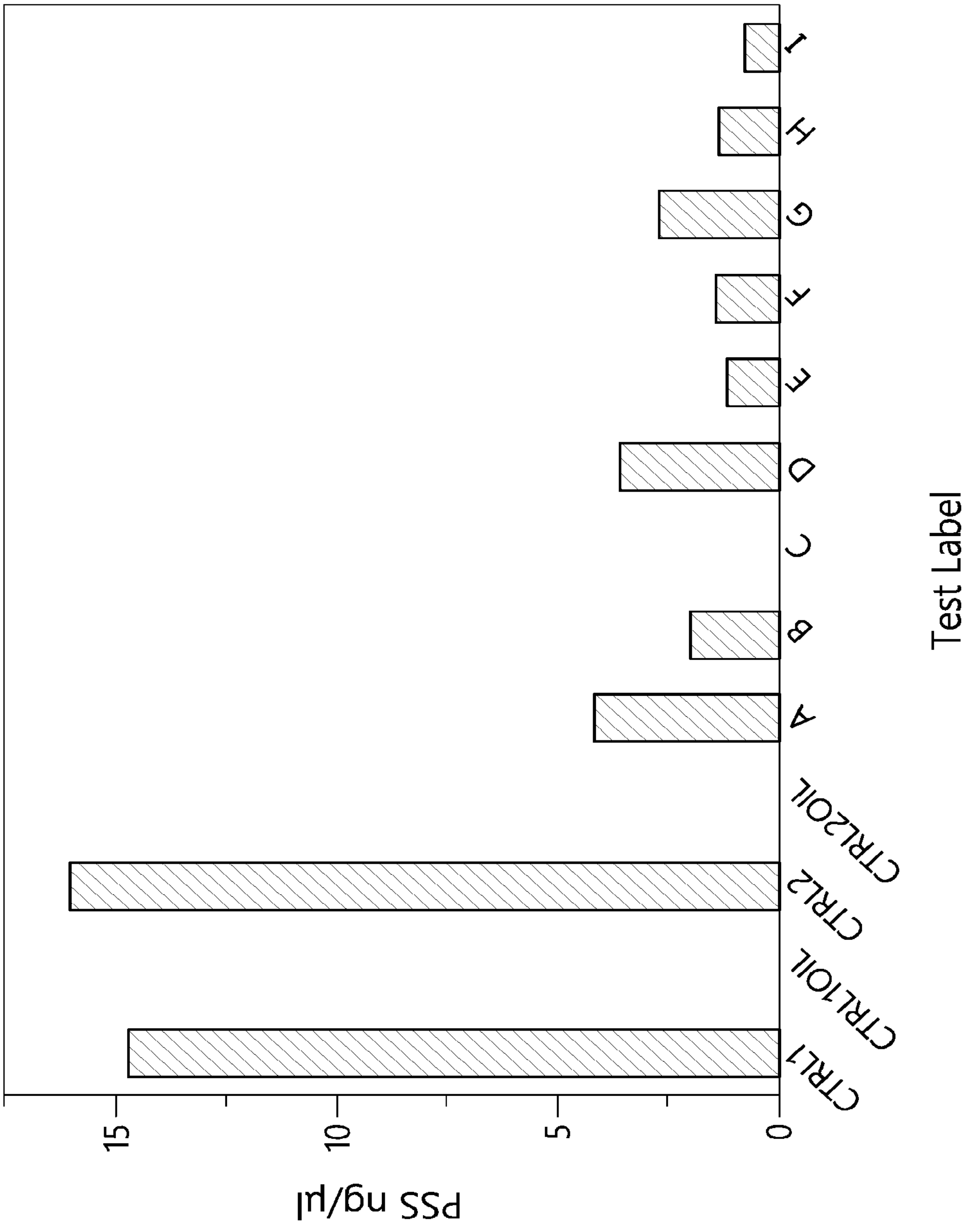
FIG. 9 is a bar chart that shows the amount of PSS detected in experiments with various Capstone® deposition conditions.

An experiment was conducted to test the PSS leaching in a Capstone 110® treated conductive coating layer. The electrowetting process was conducted in 0.05% Tween 20 buffer for 1 hour at 300 V, 80° C., 30 Hz, 5 sec transport rate. The amount of PSS in the recovered droplets was measured using RhoB:PSS FP assay as described in Example 3. The experiment conditions of Test A to I and the controls are summarized in Table 7, and the results are shown in FIG. 9. The results showed that higher concentration of Capstone 110®, having ethanol in the spray solvent, longer rinse time, and increasing the water ratio in rinsing solvent are all effective to prevent or reduce PSS leaching.

TABLE 7

| Test Label | Capstone ® concentration | Spray solvent (v/v) | Rinse solvent (v/v) | Rinse time |
|---|---|---|---|---|
| A | 0.25 | $H_2O$ | 1:1 (EtOH:$H_2O$) | 20 |
| B | 0.5 | $H_2O$ | $H_2O$ | 1 |
| C | 1 | $H_2O$ | 4:1 (EtOH:$H_2O$) | 10 |
| D | 0.25 | 1:1 (EtOH:$H_2O$) | $H_2O$ | 10 |
| E | 0.5 | 1:1 (EtOH:$H_2O$) | 4:1 (EtOH:$H_2O$) | 20 |
| F | 1 | 1:1 (EtOH:$H_2O$) | 1:1 (EtOH:$H_2O$) | 1 |
| G | 0.25 | 4:1 (EtOH:$H_2O$) | 4:1 (EtOH:$H_2O$) | 1 |
| H | 0.5 | 4:1 (EtOH:$H_2O$) | 1:1 (EtOH:$H_2O$) | 10 |
| I | 1 | 4:1 (EtOH:$H_2O$) | $H_2O$ | 20 |
| Control 1 | 0.25 | 4:1 (EtOH:$H_2O$) | 4:1 (EtOH:$H_2O$) | 10 |
| Control 1 Oil | 0.25 | 4:1 (EtOH:$H_2O$) | 4:1 (EtOH:$H_2O$) | 10 |
| Control 2 | 0.25 | 4:1 (EtOH:$H_2O$) | 4:1 (EtOH:$H_2O$) | 10 |
| Control 2 Oil | 0.25 | 4:1 (EtOH:$H_2O$) | 4:1 (EtOH:$H_2O$) | 10 |

Example 8

An experiment was conducted to compare the PSS leaching in various spray coating conditions for Capstone 110® treated conductive coating layers. The electrowetting process was conducted in 0.05% Tween 20 buffer for 1 hour at 300 V, 80° C., 30 Hz, 5 sec transport rate. The amount of PSS in the recovered droplets was measured using RhoB: PSS FP assay as described in Example 3 and the results are summarized in Table 8 below. Various spray coating conditions were tested, including 1 or 2 layers of coating, a spray head speed of 50 mm/s or 100 mm/s, an ultrasonic pulse rate of 50 hz or 100 hz, and a slow rate of 1 ml/min or 5 ml/min. The experiment conditions of each test and the amount of PSS leaching detected are summarized in Table 8.

TABLE 8

| Test Label | Pattern | Capstone [%] | Layers | Speed [mm/s] | Pulse rate [hz] | Flow rate [ml/min] | PSS (mP) | PSS (ng/μL) |
|---|---|---|---|---|---|---|---|---|
| J | −−−+− | 1 | 1 | 50 | 100 | 1 | 114 | 0.45 |
| K | −−+−− | 1 | 1 | 50 | 50 | 5 | 97 | 0.10 |
| L | −−+−+ | 1 | 1 | 100 | 50 | 5 | 117 | 0.51 |
| M | −+−−+ | 1 | 2 | 100 | 50 | 1 | 106 | 0.28 |
| N | −+−++ | 1 | 2 | 100 | 100 | 1 | — | — |
| O | −+++− | 1 | 2 | 50 | 100 | 5 | 108 | 0.32 |
| P | +−−−+ | 2 | 1 | 100 | 50 | 1 | 110 | 0.37 |
| Q | +−−+− | 2 | 1 | 50 | 100 | 1 | 129 | 0.75 |
| R | +−+++ | 2 | 1 | 100 | 100 | 5 | 98 | 0.12 |
| S | ++−−− | 2 | 2 | 50 | 50 | 1 | 92 | 0.00 |
| T | +++−− | 2 | 2 | 50 | 50 | 5 | — | — |
| U | +++++ | 2 | 2 | 100 | 100 | 5 | 92 | 0.00 |

The results in Test U, S, K, R, O, P and T were further evaluated using digital fluidics-based Javelin enrichment PCR that contained Phusion II polymerase and the results are shown in Table 9. A cartridge without capstone coating or any other cationic passivation layer coating was used for comparison (control). The target specificity was greater than 0.95 for all conditions. The DNA yield, uniformity, and Span95 were reported. The results showed that 2 layers of coating with less stressful spray conditions provided less PSS leaching, better DNA yield and uniformity, and lower Span95.

TABLE 9

| Capstone cartridge | Capstone Layers | Yield (ng/μL) | Uniformity | Span95 |
|---|---|---|---|---|
| U | 2 | 14.4 | 0.85 | 50 |
| S | 2 | 17.2 | 0.806 | 100 |
| K | 1 | 20.3 | 0.787 | 174 |
| R | 1 | 20.8 | 0.794 | 128 |
| O | 2 | 29.1 | 0.819 | 54 |
| P | 1 | 17.3 | 0.838 | 63 |
| T | 2 | 21.3 | 0.8 | 74 |
| Control | 1 | 18.7 | 0.775 | 132 |

Example 9

An experiment was conducted to compare the PSS leaching in various preparation conditions for Capstone 110® treated conductive coating layers. The electrowetting process was conducted in 0.05% Tween 20 buffer for 1 hour at 300 V, 80° C., 30 Hz, 5 sec transport rate. The amount of PSS in the recovered droplets was measured using RhoB: PSS FP assay as described in Example 3 and the results are summarized in Table 10 below.

TABLE 10

| Test # | Layers | Spray Solvent (ethanol to water: v/v) | Capstone Conc. (%) | Rinse time (min) | Rinse solvent | Speed [mm/s] | Pulse rate [hz] | Flow rate [ml/min] | Coating layer | Capstone binding polarization | PSS Polarization | PSS (ng/μL) |
|---|---|---|---|---|---|---|---|---|---|---|---|---|
| 1 | 1 | 1 to 1 | 0.25 | 10 | $H_2O$ | 100 | 100 | 1 | 1 | 183 | 150, 168 | 1.12, 1.45 |
| 2 | 2 | 1 to 1 | 0.25 | 10 | $H_2O$ | 100 | 100 | 1 | 2 | 97 | 104 | 0.26 |
| 3 | 1 | 4 to 1 | 1 | 20 | $H_2O$ | 100 | 100 | 1 | 1 | 145 | 90, 101 | 0, 0.2 |
| 4 | 2 | 4 to 1 | 1 | 20 | $H_2O$ | 100 | 100 | 1 | 2 | 139 | 93 | 0.05 |
| Water* | n/a | n/a | n/a | 10 | $H_2O$ | n/a | n/a | n/a | Water rinse only | 175 | 249 | ~10 |
| control | n/a | n/a | n/a | n/a | n/a | n/a | n/a | n/a | n/a | 166 | 181, 209 | ~3-4 |

Figure 10:
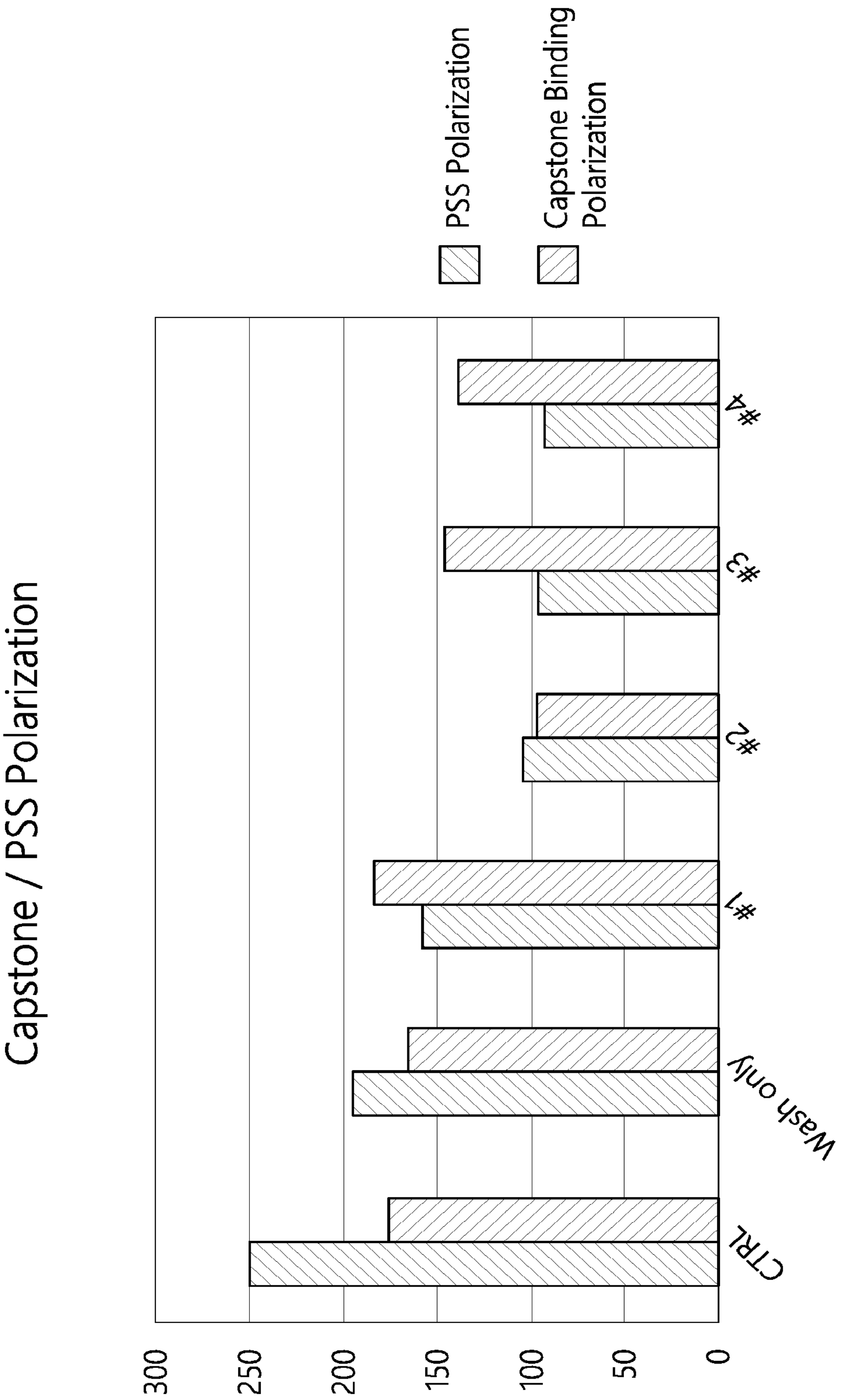
FIG. 10 is a bar chart that shows the Capstone binding polarization and PSS polarization measured in Example 9.

The Capstone binding polarization and PSS polarization results are shown in FIG. 10. The capstone polarization measures the amount of cationic material leaching, and the PSS polarization measures the amount of PSS leaching in the sample. Cartridges with capstone coating conditions from Test #1 and #4 were further evaluated with digital fluidics-based Javelin enrichment PCR that contains Phusion II polymerase. The target specificity was greater than 0.95 for all conditions. The DNA yield, uniformity, and Span95 are summarized below in Table 11. The results showed that 2 layers of coating, spray solvent ratio of 4:1 (ethanol to water: v/v), 1% of Capstone, and 20 mins of rinsing with water provided high DNA yield, target uniformity, and low Span 95.

TABLE 11

| Test # | Yield (ng/μL) | Uniformity | Span95 |
|---|---|---|---|
| 1 | 27.2 | 0.894 | 41 |
| 4 | 36.6 | 0.919 | 36 |
| Standard Cartridge (control) | 16.2 | 0.863 | 46 |

Alternate Embodiments without PSS

Example 10

A microfluidic device for sequencing a nucleic acid sample can be prepared in the absence of any PSS. In this method, a microfluidic device component is provided that comprises a surface. That surface is first treated to attach one or more first monomers to the surface, wherein the first monomer has one or more functional groups on its surface. After the first monomer has been added to the surface, then a conductive coating layer is formed on the surface by reacting the first monomer with one or more second monomers to form one or more conductive polymer coatings.

Figure 11:
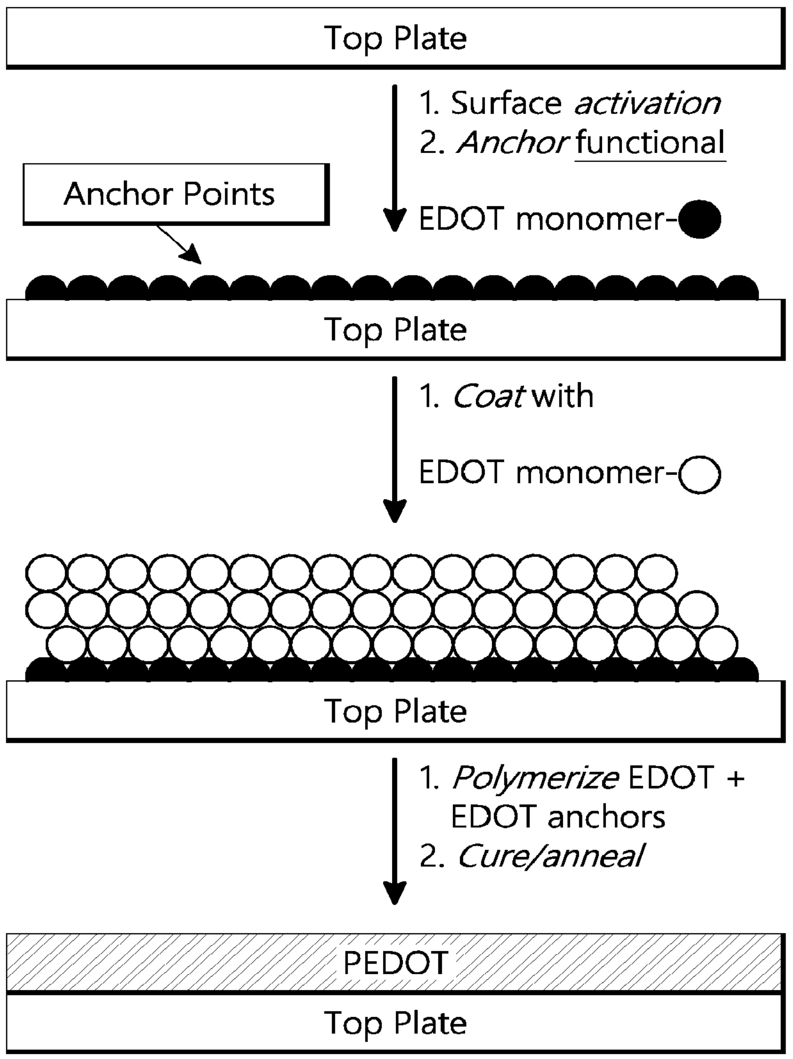
FIG. 11 is a diagram that illustrates a non-limiting exemplary method for preparing a microfluidic device with a PEDOT coating.

FIG. 11 illustrates an exemplary method for preparing a microfluidic device described herein. As shown in FIG. 11, the method uses the treatment of the top plate (e.g. cycloolefin polymer) with plasma etching to create reactive functional groups. After etching, a suitably functionalized ethlenedioxythiophene (EDOT) monomer is covalently attached to the top plate. The attached EDOT monomers serve as anchor points from which PEDOT polymers are synthesized using chemical or electrical polymerization methods. Other chemical attachment strategies may be employed to form the top plate anchor upon which the PEDOT polymer is synthesized. In some embodiments, the plasma etching involves a process of exposing the surface to a plasma, typically in air or oxygen to generate active species on the surface.

Surface Treatment

In some embodiments, treating the surface to form a first layer comprises applying an etching treatment. In some embodiments, the etching treatment comprises plasma etching, oxygen etching, or UV etching. In some embodiments, treating the surface comprises covalently attaching the first monomer to the surface. In some embodiments, treating the surface comprises attaching a chemically reactive species to the surface. In some embodiments, the chemically reactive species contains one or more functional group. In some embodiments, the functional group in the chemically reactive species is silanol. In some embodiments, treating the surface to attach one or more first monomer to the surface comprises attaching a chemically reactive species to the surface and then attaching the chemically reactive species to the first monomer. In some embodiments, the chemically reactive species includes alcohol, amine, alkyne, alkene, ketone, imine, acid, azide, and amide. In some embodiments, the functional group on the chemically reactive species is selected from alcohol, amine, alkyne, alkene, ketone, imine, acid, azide, and amide, and any combinations thereof.

In some embodiments, treating the surface to form a first layer comprises applying an oxidative chemical vapor deposition treatment. In some embodiments, treating the surface to attach one or more first monomer comprises: providing a metal-containing oxidant; contacting the surface with the metal-containing oxidant to form an oxidant-enriched surface; contacting the oxidant-enriched surface with the first monomer; and attaching the first monomer to the oxidant-enriched surface. In some embodiments, treating the surface means using a plasma to create a surface having one or more chemically reactive species with functional groups. These chemically reactive species can then be attached to a monomer or complementary reactive species. Some non-liming examples of the chemically reactive species include silanols which can react with chlorosilanes or ethoxysilanes on the surface.

In some embodiments, providing a metal-containing oxidant comprises subliming the metal-containing oxidant to form a gaseous form of the metal-containing oxidant. In some embodiments, contacting the surface with the metal-containing oxidant comprises contacting the surface with the metal-containing oxidant in a gaseous form. In some embodiments, the metal-containing oxidant is selected from the group consisting of iron(III) chloride, iron(III) toslyate, potassium iodate, potassium chromate, ammonium sulfate and tetrabutylammonium persulfate.

In some embodiments, the first monomer is selected from the group consisting of optionally substituted thiophenes, pyrroles, anilines, phenylenes, acetylene, azepines, p-phenyl sulfide, carbazoles, and combinations thereof. In some embodiments, the first monomer is ethylenedioxythiophene having one or more functional group capable of forming covalent bonds. In some embodiments, the first monomer is ethylenedioxythiophene monomer having one or more functional group selected from the group consisting of alcohol, amine, alkyne, alkene, ketone, imine, acid, azide, any combination thereof Forming Conductive Coating Layer In some embodiments, reacting the first monomer in the first layer with one or more second monomer to form the conductive polymer comprises a chemical polymerization or electrical polymerization. In some embodiments, forming the conductive coating layer further comprises forming a three-dimensional network of conductive polymer in the conductive coating layer.

In some embodiments, the second monomer is selected from the group consisting of optionally substituted thiophenes, pyrroles, anilines, phenylenes, acetylene, azepine, p-phenyl sulfide, carbazole, and combinations thereof. In some embodiments, the second monomer is ethylenedioxythiophene. In some embodiments, the first monomer and the second monomer are the same. In some embodiments, the first monomer and the second monomer are different.

In some embodiments, the method described herein further comprises providing the first monomer in a gaseous form. In some embodiments, the method described herein further comprises providing the second monomer in a gaseous form.

In some embodiments, the conductive polymer includes at least one polymer selected from the group consisting of polyaniline, polyphenylene, polyacetylene, poly(pyrrole), polyindole, polycarbazole, and poly(3,4-ethylenediophene) (PEDOT). In some embodiments, the conductive polymer comprises poly(3,4-ethylenediophene) (PEDOT). In some embodiments, the conductive coating layer has a conductivity in the range of about 0.01 S/cm to about 250 S/cm, 0.01 S/cm to about 150 S/cm, 0.01 S/cm to about 100 S/cm. In some embodiments, the conductive coating layer has a conductivity of greater than about 0.05 S/cm, about 0.1 S/cm, about 0.15 S/cm, about 0.25 S/cm, about 0.5 S/cm, about 1.0 S/cm, about 1.5 S/cm, about 2.5 S/cm, about 5 S/cm, about 7.5 S/cm, about 10 S/cm, about 15 S/cm, about 20 S/cm, about 25 S/cm, about 30 S/cm, about 40 S/cm, about 50 S/cm, about 60 S/cm, about 70 S/cm, about 80 S/cm, about 90 S/cm, or about 100 S/cm.

The conductive coating layer may be smooth or rough. In some embodiments, the conductive coating layer is a uniform layer. In some embodiments, the conductive coating layer has a non-uniform layer. In some embodiments, the conductive coating layer has an average thickness in the range of about 0.1 nm to about 100 nm, about 0.1 nm to about 80 nm, about 0.1 nm to about 70 nm, about 0.1 nm to about 60 nm, about 0.1 nm to about 50 nm, about 0.1 nm to about 40 nm, about 0.1 nm to about 20 nm, about 0.1 nm to about 10 nm, about 1 nm to about 100 nm, about 1 nm to about 80 nm, about 1 nm to about 70 nm, about 1 nm to about 60 nm, about 1 nm to about 50 nm, about 1 nm to about 40 nm, about 1 nm to about 20 nm, about 1 nm to about 10 nm, about 5 nm to about 100 nm, about 5 nm to about 80 nm, about 5 nm to about 70 nm, about 5 nm to about 60 nm, about 5 nm to about 50 nm, about 5 nm to about 40 nm, about 5 nm to about 20 nm, or about 5 nm to about 10 nm. In some embodiments, the conductive coating layer has an average thickness of about 1 nm, 5 nm, 10 nm, 20 nm, 30 nm, 30 nm, 40 nm, 50 nm, 60 nm, 70 nm, 80 nm, 90 nm, or 100 nm.

The conductive coating layer may have a resistance in the range of about 0.1 kOhm to about 100 kOhm, about 0.1 kOhm to about 80 kOhm, about 0.1 kOhm to about 60 kOhm, about 0.1 kOhm to about 50 kOhm, about 0.1 kOhm to about 30 kOhm, about 0.1 kOhm to about 20 kOhm, about 0.1 kOhm to about 15 kOhm, about 0.1 kOhm to about 10 kOhm, about 1 kOhm to about 100 kOhm, about 1 kOhm to about 50 kOhm, about 1 kOhm to about 25 kOhm, about 1 kOhm to about 20 kOhm, about 1 kOhm to about 15 kOhm, or about 1 kOhm to about 10 kOhm.

Additional Manufacturing Steps

In some embodiments, the method described herein further comprises annealing the conductive coating layer. In some embodiments, the method described herein further comprises patterning the conductive coating layer to form electrodes, sensors, grounds, wires, or any combinations thereof. In some embodiments, the method described herein further comprises patterning the conductive coating layer to form electrodes. In some embodiments, the method described herein further comprises patterning the conductive coating layer to serve as a receptor of electrons.

In some embodiments, the method described herein further comprises forming a hydrophobic layer adjacent to the conductive coating layer. In some embodiments, the method described herein further comprises attaching one or more oligonucleotide to the hydrophobic layer.

In some embodiments, the method described herein further comprises forming one or more microchannels, microtracks or micropaths.

In some embodiments, the microfluidic device is a digital microfluidic device employs mechanisms selected from the group consisting of electrowetting, opto-electrowetting, electrostatic, electrophoretic, dielectrophoretic, electro-osmotic and combinations thereof.

Other parts of the microfluidic device such as reference electrodes, dielectric layer, hydrophilic layer can be prepared using the methods described herein.

Example 11

Figure 12:
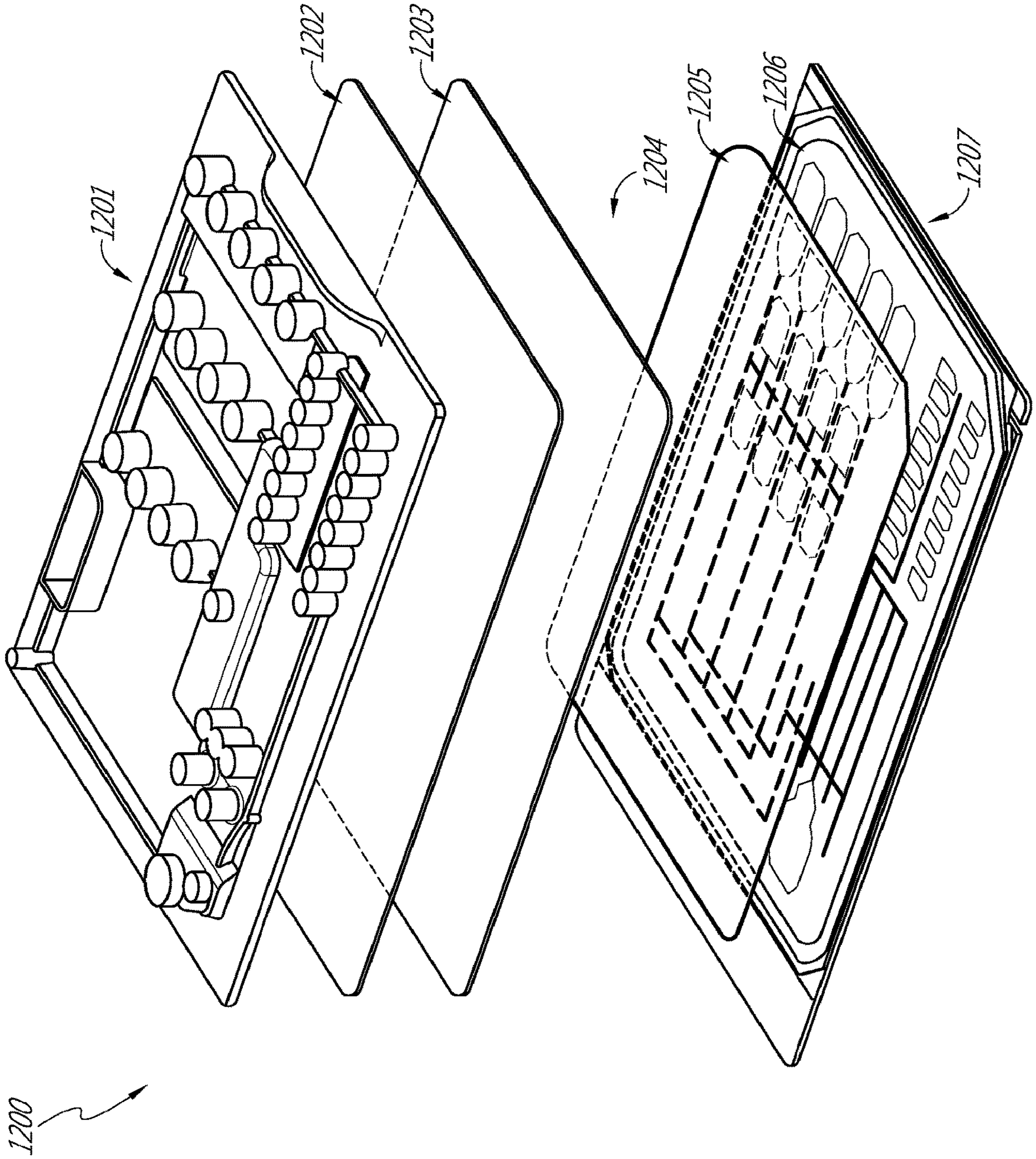
FIG. 12 is an exploded view that illustrates a non-limiting example of a microfluidic device prepared according to the method described in Example 10.

FIG. 12 illustrates an example of the microfluidic device prepared according to the method described in Example 10. As shown in FIG. 12, a microfluidic device 1200 for sequencing a nucleic acid can include a top plate 1201 that can be made of a molded plastic. Disposed below the top plate 1201 is a conductive coating layer 1202 which may include one or more conductive polymers, such as a homopolymer. A hydrophobic coating layer 1203 is disposed directly adjacent to the conductive coating layer 1202. The device may have a chamber adjacent to the hydrophobic coating layer 1203 that is filled with a filler fluid 1204 that is immiscible with any sample fluid that runs within the device. For example, the sample fluid may include a nucleic acid sample. In some embodiments, the microfluidic device can also include an additional hydrophobic coating layer 1205 disposed below the hydrophobic coating layer 1203, a dielectric coating layer 1206 disposed below the hydrophobic coating layer 1203, and all of which as supported by a printed circuit board 1207.

In some embodiments, the molded top plate 1201 is made of paper, ceramic, carbon, fabric, nylon, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Gore-tex®, Marlex®, expanded polytetrafluoroethylene (e-PTFE), low density polyethylene (LDPE), high density polyethylene (HDPE), polypropylene (PP), and poly(ethylene terephthalate) (PET).

In some embodiments, the conductive coating layer includes only one type of conductive polymer. In some embodiments, the conductive coating layer does not include any copolymer. In some embodiments, the conductive coating layer does not include any polystyrene sulfonic acid or polystyrene sulfonate.

In some embodiments, the conductive coating layer is formed using an oxidative chemical vapor deposition process. In some embodiments, the conductive coating layer is formed by polymerizing one type of monomer.

In some embodiments, the conductive coating layer is hydrophobic. In some embodiments, the conductive polymer is water-resistant. In some embodiments, the conductive polymer does not include any polystyrene sulfonic acid or polystyrene sulfonate. In some embodiments, the conductive polymer is poly(3,4-ethylenediophene) (PEDOT) homopolymer.

Example 12

A nucleic acid sample can be analyzed using the device described in Example 11 with a high accuracy. Sequencing a nucleic acid sample using the microfluidic device described in Example 11 can prevent leaching of any hydrophilic polymer into the sample fluid. Elimination of hydrophilic polymer such as polystyrene sulfonic acid and polystyrene sulfonate from the conductive coating layer prevents possible contamination of the sample fluid and also prevents enzyme inhibition that may be caused by the leaching of any hydrophilic polymers. Therefore, the determination of nucleic acid sequence can be achieved with high accuracy.

In some embodiments, the method of sequencing a target nucleic acid using the microfluidic device can include injecting a sample fluid comprising the target nucleic acid to the microfluidic device; and sequencing the target nucleic acid.

What is claimed is:

1. A microfluidic device comprising:
a surface of the microfluidic device;
a conductive coating layer comprising one or more polymers, including an anionic polymer;
a passivation layer comprising a cationic compound;
one or more hydrophobic coating layers; and
one or more microchannels, microtracks or micropaths;
wherein the passivation layer is immediately adjacent to the conductive coating layer and in between the conductive coating layer and one hydrophobic coating layer, wherein the passivation layer comprises a water-insoluble material, and wherein the water-insoluble material comprises a charge complex of the anionic polymer of the conducting coating layer with the cationic compound.

2. The microfluidic device of claim 1, wherein the surface comprises a substrate.

3. The microfluidic device of claim 2, wherein the substrate comprises a top plate.

4. The microfluidic device of claim 1, wherein the microfluidic device further comprises a chamber having a filler fluid that is immiscible with a sample fluid.

5. The microfluidic device of claim 1, wherein said microfluidic device is a digital microfluidic device that employs mechanisms selected from electrowetting, opto-electrowetting, electrostatic, electrophoretic, dielectrophoretic, electro-osmotic, or combinations thereof.

6. The microfluidic device of claim 5, wherein the digital microfluidic device employs an electrowetting mechanism.

7. The microfluidic device of claim 1, wherein the conductive coating layer comprises a conductive ink.

8. The microfluidic device of claim 1, wherein the conductive coating layer is patterned.

9. The microfluidic device of claim 1, wherein the conductive coating layer is grounded or floated or serves as a receptor of electrons.

10. The microfluidic device of claim 1, wherein the conductive coating layer forms electrowetting device electrodes.

11. The microfluidic device of claim 1, wherein the anionic polymer of the conductive coating layer comprises polystyrene sulfonic acid or polystyrene sulfonate.

12. The microfluidic device of claim 1, wherein the conductive coating layer further comprises poly(3,4-ethylenedioxythiophene) (PEDOT).

13. The microfluidic device of claim 1, wherein the anionic polymer is polystyrene sulfonic acid or polystyrene sulfonate and the cationic compound is selected from the group consisting of cationic surfactants, cationic polymers, and combinations thereof.

14. The microfluidic device of claim 1, wherein the passivation layer is formed by depositing the cationic compound to the conductive coating layer.

15. The microfluidic device of claim 1, wherein the passivation layer has an average thickness in the range of about 0.1 nm to 10 nm.

16. The microfluidic device of claim 1, wherein the passivation layer comprises at least one layer of the complex.

17. The microfluidic device of claim 1, wherein the cationic compound is deposited to the conductive coating layer by dip coating or spray coating.

18. The microfluidic device of claim 1, wherein the passivation layer is formed in situ during sample analysis when passing a sample fluid mixed with the cationic compound through the microchannels, microtracks or micropaths.

19. The microfluidic device of claim 1, wherein the cationic compound is selected from the group consisting of a cationic polydialkylsiloxane, a cationic acrylic polymer, and a fluorinated polycation.

* * * * *